(12) United States Patent
Jones

(10) Patent No.: US 12,230,122 B2
(45) Date of Patent: Feb. 18, 2025

(54) METHOD AND SYSTEM FOR LOCATING ONE OR MORE USERS IN AN EMERGENCY

(71) Applicant: Swift SOS Ltd, Prestatyn (GB)

(72) Inventor: Karl Jones, Chester (GB)

(73) Assignee: Swift SOS Ltd, Prestatyn (GB)

( * ) Notice: Subject to any disclaimer, the term of this patent is extended or adjusted under 35 U.S.C. 154(b) by 0 days.

(21) Appl. No.: 17/762,382

(22) PCT Filed: Sep. 23, 2020

(86) PCT No.: PCT/GB2020/052307
§ 371 (c)(1),
(2) Date: Mar. 22, 2022

(87) PCT Pub. No.: WO2021/058954
PCT Pub. Date: Apr. 1, 2021

(65) Prior Publication Data
US 2022/0335810 A1    Oct. 20, 2022

(30) Foreign Application Priority Data

Sep. 23, 2019   (GB) .................................... 1913689

(51) Int. Cl.
G08B 25/01       (2006.01)
G01C 21/00       (2006.01)
G06F 3/14        (2006.01)
G08B 25/10       (2006.01)

(52) U.S. Cl.
CPC ......... *G08B 25/016* (2013.01); *G01C 21/005* (2013.01); *G06F 3/14* (2013.01); *G08B 25/10* (2013.01)

(58) Field of Classification Search
CPC ...... G08B 25/016; G08B 25/10; G08B 21/10; G08B 25/08; G08B 27/006; G01C 21/005; G06F 3/14; H04M 11/04; H04W 4/021; H04W 4/90
See application file for complete search history.

(56) References Cited

U.S. PATENT DOCUMENTS 8,923,800 B2    12/2014  Kim et al.
9,843,914 B1 *  12/2017  Rao .................... H04W 4/90
2012/0190295 A1  7/2012  Kim et al.
2015/0111524 A1  4/2015  South
2019/0238245 A1*  8/2019  Takahashi .......... H04N 21/4882
(Continued)

FOREIGN PATENT DOCUMENTS

JP    2010-244407     10/2010
JP    2013-109484     6/2013
(Continued)

OTHER PUBLICATIONS

International Search and the Written Opinion Dated Jan. 18, 2021 From the International Searching Authority Re. Application No. PCT/GB2020/052307. (13 Pages).
(Continued)

*Primary Examiner* — Omeed Alizada

(57) ABSTRACT

There is provided a method of locating one or more users in an emergency, comprising the steps of, at a server: detecting a state of emergency; and receiving location data from at least one computing device associated with a user upon detection of the state of emergency.

20 Claims, 24 Drawing Sheets

(56) References Cited

U.S. PATENT DOCUMENTS

2019/0246260 A1* 8/2019 Edge .................. H04W 68/005
2019/0281153 A1* 9/2019 Merjanian .............. G08B 25/08
2019/0320310 A1* 10/2019 Horelik ............... H04W 68/005

FOREIGN PATENT DOCUMENTS

| KR | 10-2017-0088552 | 8/2017 |
|----|-----------------|--------|
| WO | WO 2018/217469 | 11/2018 |
| WO | WO 2019/072893 | 4/2019 |

OTHER PUBLICATIONS

Patents Act 1977: Search Report Under Section 17(5) and Examination Opinion Dated Mar. 14, 2020 From the Intellectual Property Office of the United Kingdom of Great Britain Re. Application No. GB1913689.4. (6 Pages).
Communication Pursuant to Article 94(3) EPC Dated Jan. 29, 2024 From the European Patent Office Re. Application No. 20799789.1. (9 Pages).

* cited by examiner

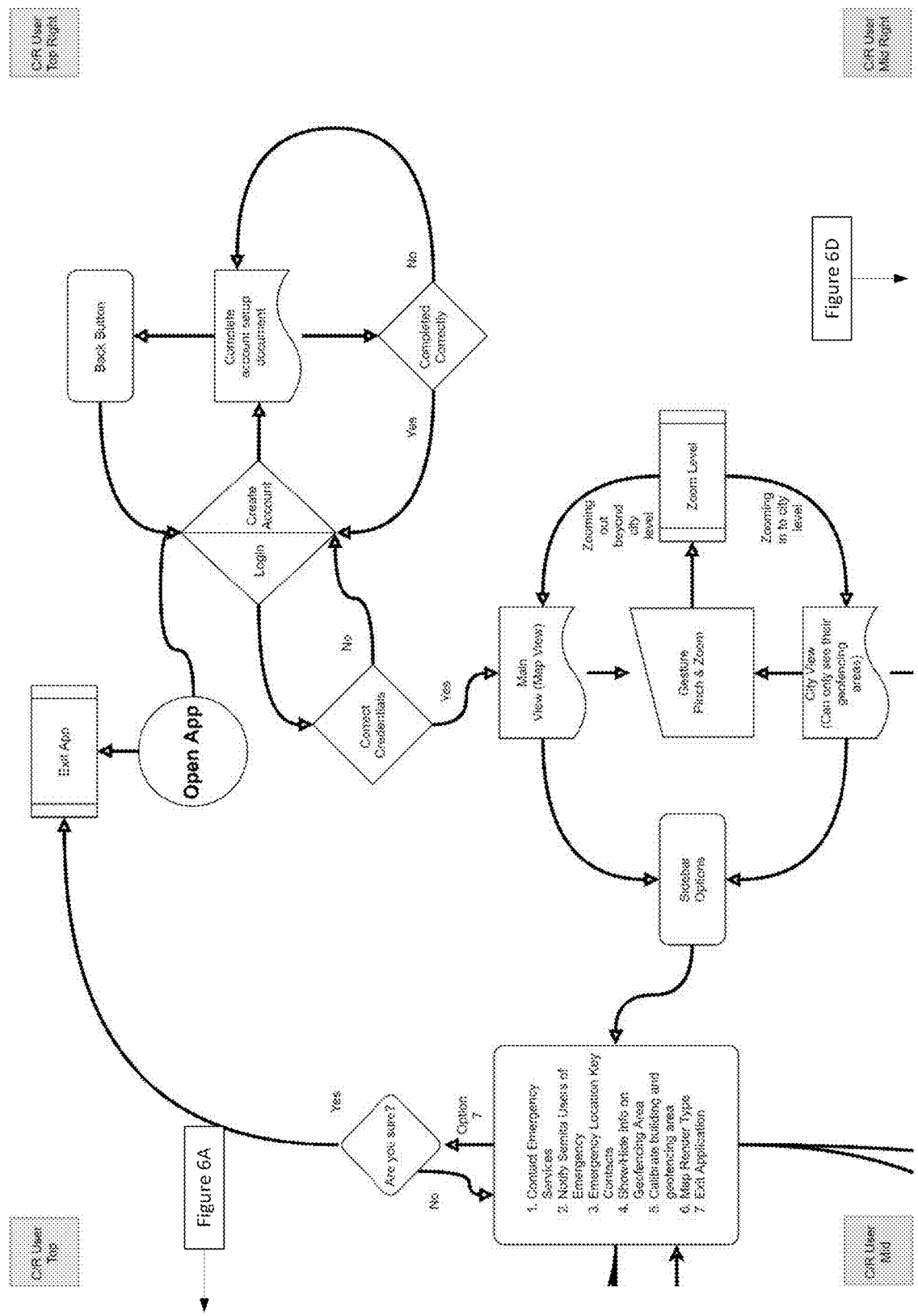

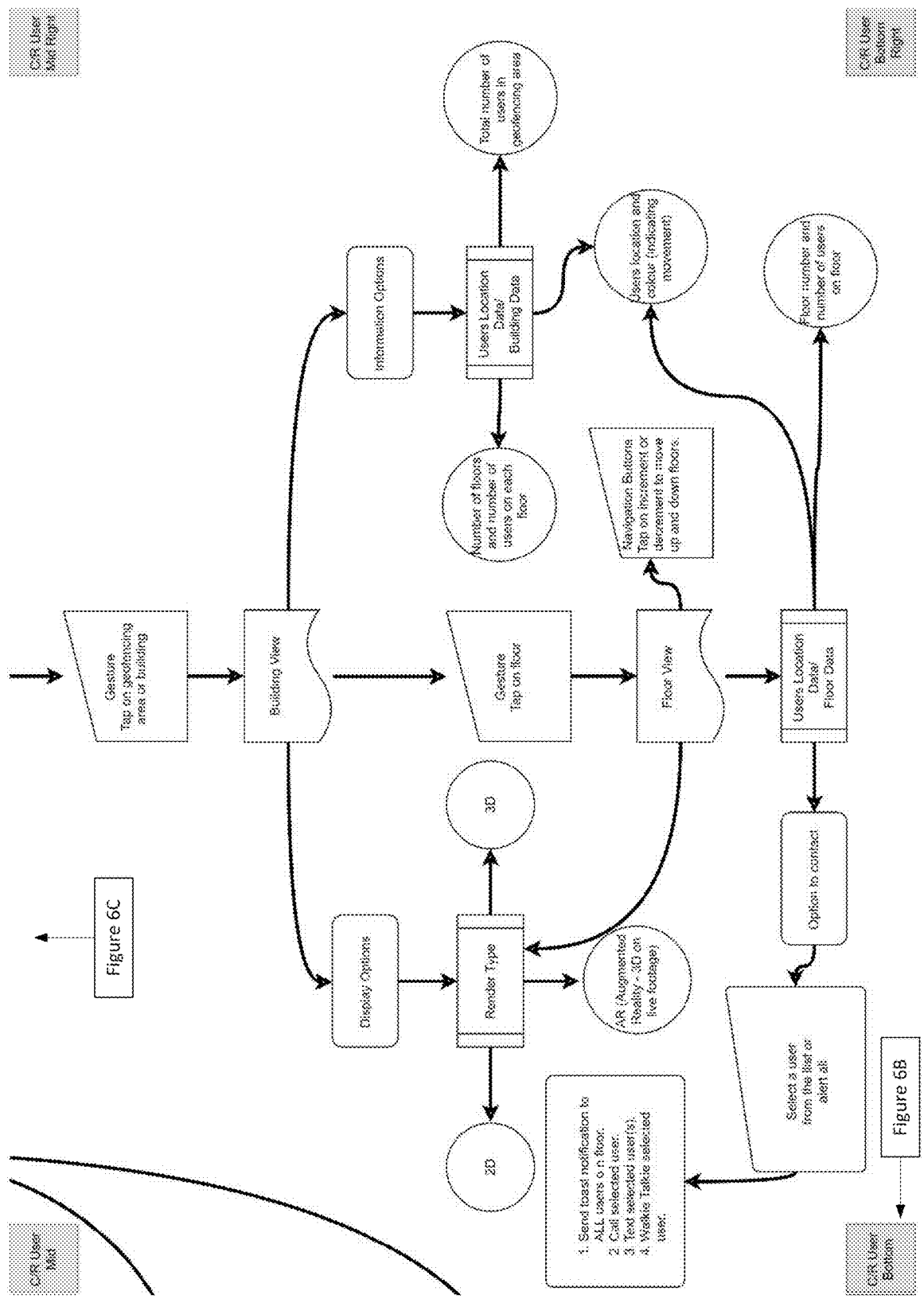

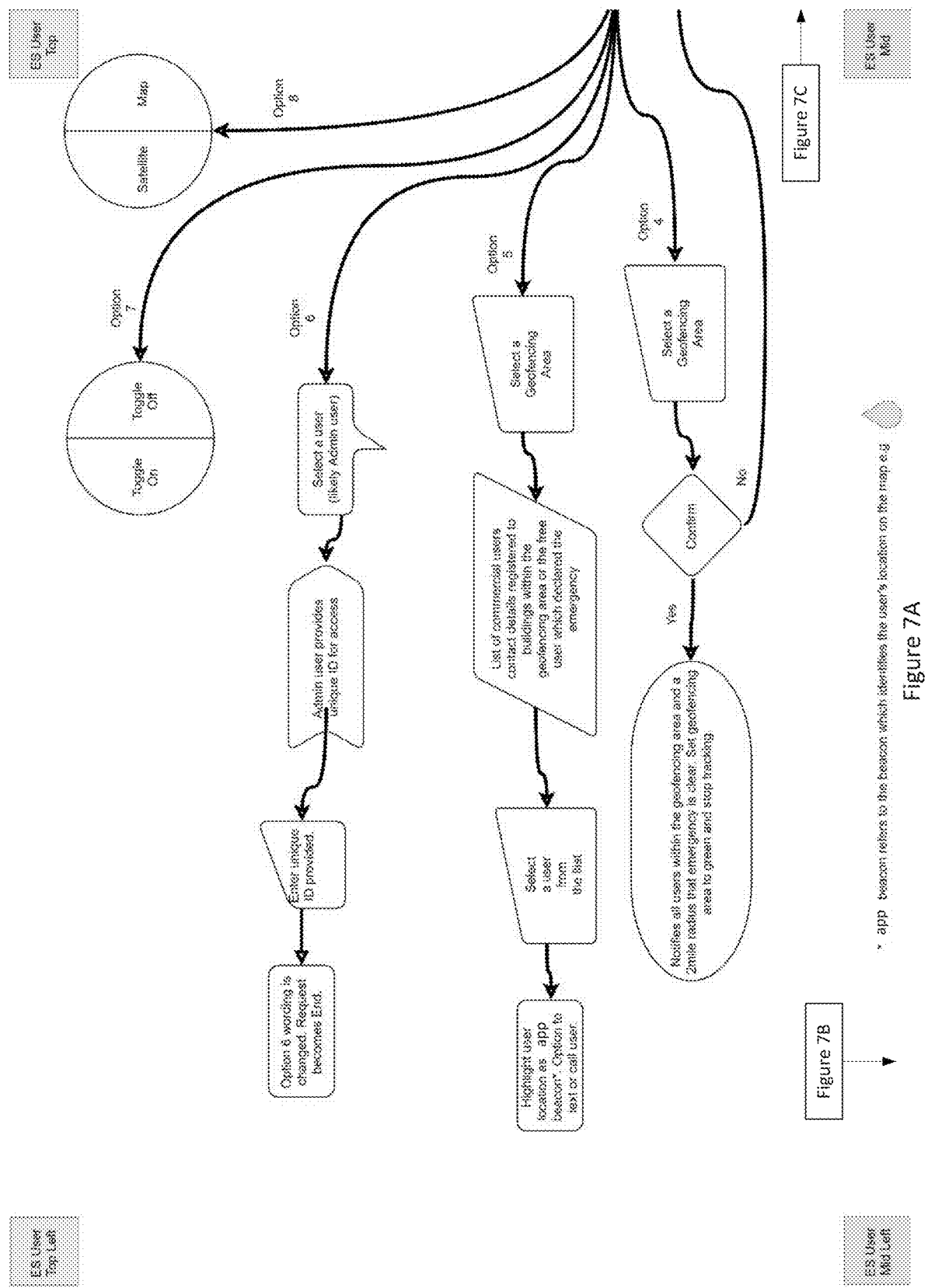

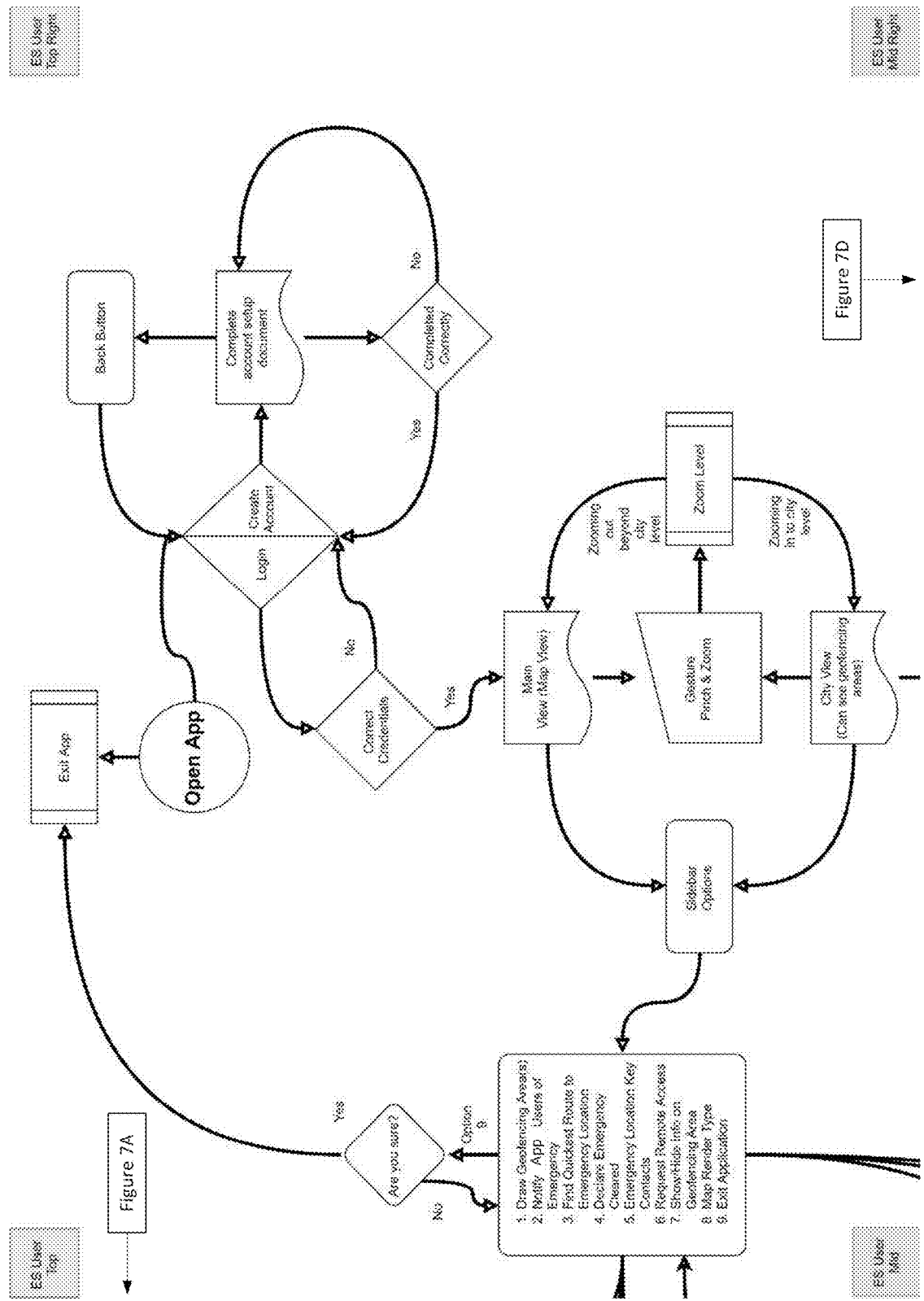

METHOD AND SYSTEM FOR LOCATING ONE OR MORE USERS IN AN EMERGENCY

RELATED APPLICATIONS

This application is a National Phase of PCT Patent Application No. PCT/GB2020/052307 having International filing date of Sep. 23, 2020, which claims the benefit of priority of United Kingdom Patent Application No. 1913689.4 filed on Sep. 23, 2019. The contents of the above applications are all incorporated by reference as if fully set forth herein in their entirety.

FIELD AND BACKGROUND OF THE INVENTION

The present disclosure relates to a method and system for locating one or more users in an emergency. The disclosure is particularly, but not exclusively, applicable to managing how data is shared between devices and users involved with the emergency including emergency service workers and victims of an emergency.

Data management and privacy are increasingly becoming issues that people have to deal with on the day to day. Data management and privacy issues become increasingly important when the data is sensitive.

Medium and large scale emergency situations involve a great number of people who often have computing devices such as smartphones on their persons. Data transmitting to and from these smartphones often increases greatly during an emergency. This puts a huge strain on existing cellular and/or Wi-Fi services.

The present disclosure seeks to overcome the problems outlined above.

SUMMARY OF THE DISCLOSURE

Aspects and embodiments of the present invention are set out in the appended claims. These and other aspects and embodiments of the invention are also described herein.

According to at least one aspect of the disclosure herein, there is described: a of locating one or more users in an emergency, comprising the steps of, at a server: detecting a state of emergency; and receiving location data from at least one computing device associated with a user upon detection of the state of emergency.

Optionally, the method comprising the further step of transmitting the location data from the at least one computing device to the server. Optionally, the user is owner of the computing device. The method operates based on the strong likelihood that users carry their computing devices on their person at least most of the time.

Optionally, the computing device is one of: a mobile phone; a smartphone; a personal computing device; a wearable device; and a portable computer (e.g. a laptop).

Optionally, the location data is continually streamed. That is, the location data may be continuously transmitted (while the emergency is in progress), such that "live" updates as to the location of the computing device may be received.

Optionally, the method further comprises the step of establishing a session for data transfer during the course of the emergency upon detection of the state of emergency, preferably wherein location data is received only while the session is in place.

Optionally, the method further comprises the steps of detecting the end of the state of emergency; and ending the session upon detection of the end of the state of emergency; preferably wherein ending the session comprises deleting data associated with the session.

Optionally, the method further comprises the step of assigning an identifier to each computing device for the session. Preferably, the identifier is temporary.

Optionally, the state of emergency is in relation to a particular area and data transmitted in relation to the at least one computing device is geo-fenced based on the bounds of the area. Optionally, location data is received from at least one computing device in the area.

Optionally, the method further comprises the step of recording when a computing device leaves the area. Optionally, the method further comprises one of the following steps: adding the computing device that has left the area to a list for later follow up; and seeking a confirmation that the user of the computing device (and/or optionally one or more associated individuals) that has left the area is safe and/or has left the area.

Optionally, detecting a state of emergency comprises receiving a user-activated alarm from at least one computing device. That is, a user may activate the alarm (optionally via a software application on which the method is implemented) upon becoming aware of an emergency.

Optionally, the method further comprises the step of receiving a further user-activated alarm; determining whether the further user-activated alarm relates to the same emergency as the user-activated alarm; and, upon determining that the further user-activated alarm relates to the same emergency as the user-activated alarm, disregarding and/or taking no action in respect of the further user-activated alarm Optionally, the method further comprises further comprising the step of notifying the at least one computing device of the state of emergency. Optionally, only computing devices within the area are notified.

Optionally, said notifying comprises requesting a confirmation message from the user of the at least one computing device.

Optionally, the method further comprises the step of monitoring for receipt of the confirmation message in respect of a particular computing device for a predetermined time period; and classifying each computing device in dependence on whether the relevant confirmation message is received within the predetermined time period. The classification may be one of: the computing device is with its user/owner; and the computing device is not with its user/owner.

Optionally, the method further comprises the step of receiving, in addition to the location data, at least one of the following information from the at least one computing device: contact information; the number of people at the location of the computing device and/or under the care of the user of the computing device; any special assistance requirements of the people at the location of the computing device and/or under the care of the user of the computing device.

Optionally, the method further comprises the step of comparing location data with previously received location data from a particular computing device to determine movement of the computing device.

Optionally, the method further comprises the step of selectively transmitting the location data (from the server) to at least one further computing device based on an identity of the user(s) of the at least one further computing device.

Optionally, the method further comprises the step of selectively transmitting mapping data related to the area in which the emergency is occurring to the at least one further computing device based on an identity of the user(s) of the at least one further computing device; preferably wherein the mapping data comprises data indicative of at least a 2D, 3D and/or augmented reality view of a or the area associated with the emergency situation.

Optionally, the method further comprises the step of presenting the location data in combination with a/the mapping data on a display interface on the at least one further computing device.

Optionally, the method further comprises the step of representing the at least one computing device as a beacon on the display interface.

Optionally, the method further comprises the step of presenting the further information relating to a particular computing device at the relevant beacon on the display interface.

Optionally, the method further comprises the step of changing the appearance of a beacon based on time since the last change of location of the associated computing device.

Optionally, the method further comprises the step of presenting the location of the further computer device(s) on the display interface.

Optionally, said selective transmission is based on whether the user of the further computer device(s) is a member of the emergency services.

Optionally, the received location data comprises receiving at least one of: global positioning system (GPS) data; data related to distance from one or more mobile phone cells; subscriber identity module (SIM)-based location data; barometric data; and Wi-Fi (RTM) based location data.

Optionally, the method further comprises the step of selectively transmitting of the location data and/or a/the site data is based on if the user of the further computing device is associated with and/or located at the emergency.

Optionally, the method further comprises the step of receiving geofence data, preferably wherein the geofence data comprises at least one region within the emergency location.

Optionally, a geofence is automatically generated based on the emergency location, preferably the geofence is an extension of an additional distance (preferably around 2 miles) about the emergency location.

Optionally, the method further comprises the step of selectively transmitting of the location data and/or a/the mapping data is based on the user's association with the geofence data.

Optionally, the method further comprises the step of providing a training session, preferably, when providing the training session, location data and/or site data is not transmitted to computing devices other than those associated with the training session.

According to at least one aspect of the disclosure herein, there is described: a system for locating one or more users in an emergency; comprising: a server; and one or more computing devices; the server and at least one computing device being configured to carry out the any method as herein described.

According to at least one aspect of the disclosure herein, there is described: a system for locating one or more users in an emergency; comprising: a server; and at least one computing device; wherein the server is configured to receive location data from the one computing device upon detection of a state of emergency.

According to at least one aspect of the disclosure herein, there is described: a computing device for locating a user thereof in an emergency, comprising: means for receiving notice of a state of emergency; and means for transmitting location data upon receiving notice of the state of emergency.

According to at least one aspect of the disclosure herein, there is described: a method for tracking and managing an emergency situation comprising the steps of: receiving location data of a computing device; and selectively transmitting the location data to a further computing device based on an identity of the user of the further computing device and on an emergency state.

Optionally, the method further comprises the step of receiving information indicative of an emergency and updating an emergency state based on the information indicative of an emergency, and preferably wherein the information indicative of an emergency is an emergency report.

Optionally, if a further emergency report is received then a comparison is made with the emergency report already received and if the further emergency report substantially matches that of the emergency report then no further alarm is raised.

Optionally, the method further comprises the step of conditionally providing access to a third party.

Optionally, the step of providing access to a third party comprises generating a password and providing the password to the third party.

Optionally, the step of providing access to a third party further comprises confirming the third party has logged in and allowing location data and/or site to be transmitted to the third party.

Optionally, the method further comprises the step of removing access of the third party to the data.

According to at least one aspect of the disclosure herein, there is described: a method for tracking and managing an emergency situation, comprising the steps of: receiving site data, the site data comprising data indicative of at least a 2D, 3D and/or augmented reality view of a building and/and area associated with the emergency situation; receiving location information of a computing device; generating a display interface based on site data and location data; and displaying the display interface.

It can also be appreciated that the methods can be implemented, at least in part, using computer program code. According to another aspect of the present disclosure, there is therefore provided computer software or computer program code adapted to carry out these methods described above when processed by a computer processing means. The computer software or computer program code can be carried by computer readable medium, and in particular a non-transitory computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The disclosure also extends to a processor running the software or code, e.g. a computer configured to carry out the methods described above.

Each of the aspects above may comprise any one or more features mentioned in respect of the other aspects above.

Any feature described as being carried out by an apparatus, an application, and a device may be carried out by any of an apparatus, an application, or a device. Where multiple apparatuses are described, each apparatus may be located on a single device.

Any feature in one aspect of the disclosure may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the disclosure can be implemented and/or supplied and/or used independently.

The disclosure also provides a computer program and a computer program product comprising software code adapted, when executed on a data processing apparatus, to perform any of the methods described herein, including any or all of their component steps.

The disclosure also provides a computer program and a computer program product comprising software code which, when executed on a data processing apparatus, comprises any of the apparatus features described herein.

The disclosure also provides a computer program and a computer program product having an operating system which supports a computer program for carrying out any of the methods described herein and/or for embodying any of the apparatus features described herein.

The disclosure also provides a computer readable medium having stored thereon the computer program as aforesaid.

The disclosure also provides a signal carrying the computer program as aforesaid, and a method of transmitting such a signal.

The disclosure extends to methods and/or apparatus substantially as herein described with reference to the accompanying drawings.

Use of the words "apparatus", "server", "device", "processor", "communication interface" and so on are intended to be general rather than specific. Whilst these features of the disclosure may be implemented using an individual component, such as a computer or a central processing unit (CPU), they can equally well be implemented using other suitable components or a combination of components. For example, they could be implemented using a hard-wired circuit or circuits, e.g. an integrated circuit, and using embedded software.

It should be noted that the term "comprising" as used in this document means "consisting at least in part of". So, when interpreting statements in this document that include the term "comprising", features other than that or those prefaced by the term may also be present. Related terms such as "comprise" and "comprises" are to be interpreted in the same manner. As used herein, "(s)" following a noun means the plural and/or singular forms of the noun.

The invention will now be described by way of example, with references to the accompanying drawings in which:

BRIEF DESCRIPTION OF THE SEVERAL VIEWS OF THE DRAWINGS

FIGS. 6A, 6B, 6C, and 6D are example application flow diagrams of an example version of an application.

FIGS. 7A, 7B, 7C, and 7D are example application flow diagrams of a further example version of an application.

DESCRIPTION OF SPECIFIC EMBODIMENTS OF THE INVENTION

Figure 1:
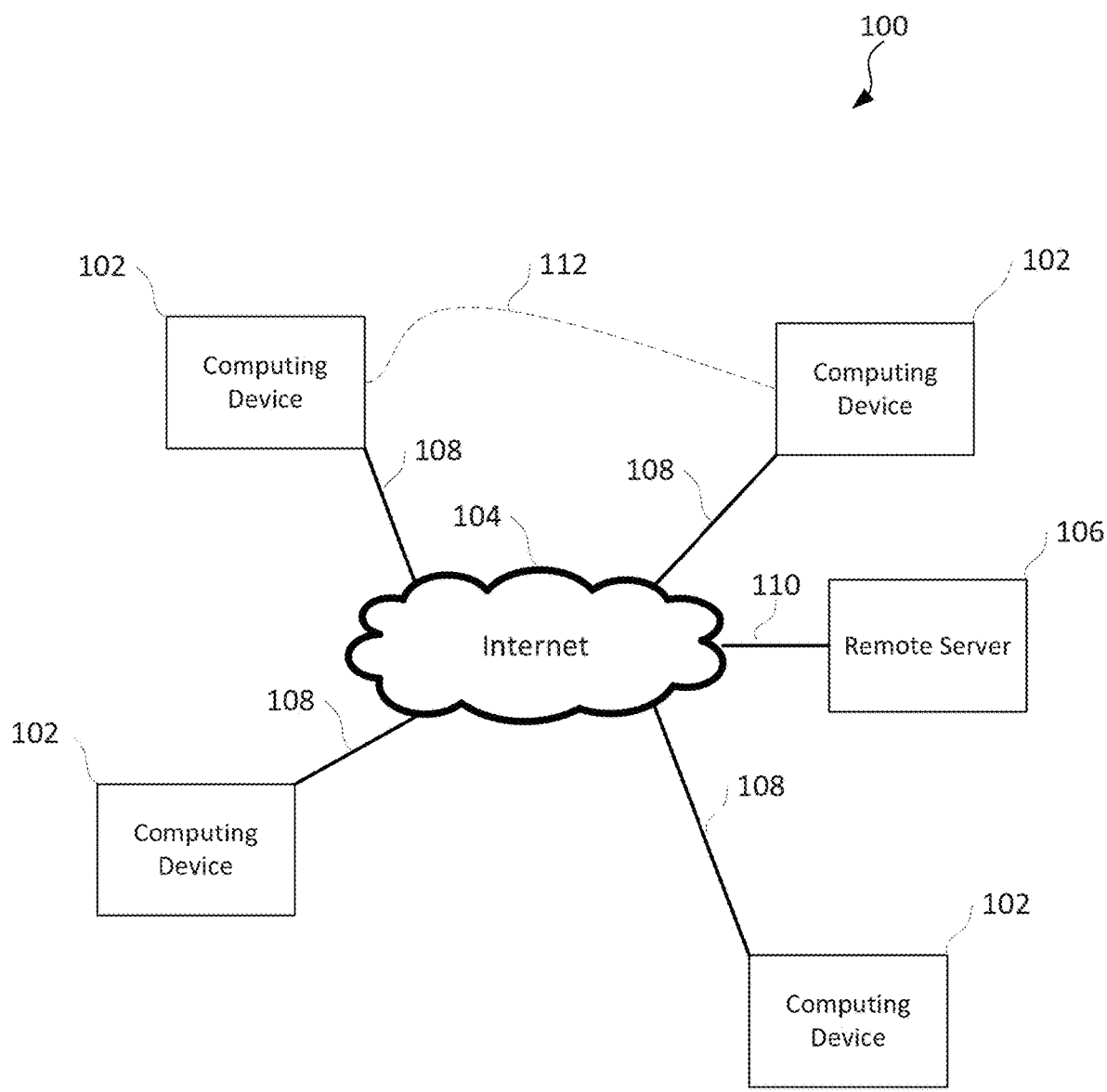
FIG. 1 is a schematic diagram of a communication network.

Referring to FIG. 1, according to a first example, in an emergency location tracking system 100, a plurality of computing devices 102 are in communication with at least the remote server 106 via the Internet 104. The computing devices 102 are connected to the Internet 104 via a communication link 116. The communication link 108 is a wireless connection. Preferably the communication link 108 is a Wi-Fi® connection via a wireless router (not shown) or a cellular radio network connection using an appropriate communication standard, such as Global System for Mobile Communications (GSM), Universal Mobile Telecommunications System (UMTS) or Long-Term Evolution (LTE), to provide data communication. Often, Wi-Fi® is preferred and the cellular radio network connection is used if no Wi-Fi® is available. The remote server 106 is connected to the Internet 104 via a server communication link 110. The communication link 110 is a wired connection. Preferably, the server communication link 110 is an Ethernet connection.

In the present example, the computing device 102 is a personal computing device, and preferably a mobile computing device, in particular a smartphone running the Android® operating system. In other examples, the computing device 102 is a smartphone, tablet computing device or laptop computer running any other type of operating system such as iOS, Linux or Windows for mobile OS. In most examples, the computing device 102 is arranged to communicate via the Wi-Fi® if available and via the cellular radio network link if Wi-Fi® isn't available and as such the computing device 102 can be referred to as User Equipment (UE).

In other examples the computing device 102 is a desktop Personal Computer (PC) configured to communicate via the Internet 104 via a wired Ethernet connection. In such an embodiment, the Ethernet connection is effectively similar to the other wireless connection 108, in that it connects, albeit via a fixed line or wired connection rather than a wireless one, to an access point or router (not shown), e.g. in the form of a broadband modem or the like, and thence on to the Internet 104.

In other examples, the computing device 102 is a computer attached to a large television for displaying a dashboard type of interface to a plurality of emergency service workers and/or other users.

In further other examples, the computing device 102 is custom hardware developed specifically for emergency situations.

Further hardware that may be incorporated into the computing device 102 includes Li-Fi sensors, sonar, and/or ray tracing. These non-standard hardware features may be included into the custom hardware example of the computing device 102 and/or may be provided as additions to the other example computing devices 102.

Computing devices 102 are also capable of connecting to each other over short range wireless communication links 112. The short range wireless communication link 112 in this example is a Bluetooth® connection. Alternatively, the computing devices are able to connect to each other over Wi-Fi®. The Wi-Fi® connection is preferably via a local access point. Alternatively, the Wi-Fi® connection is via an ad-hoc Wi-Fi® network. In a further alternative, one of the computing devices 102 establishes itself as an access point to enable other Wi-Fi® enabled computing devices 102 to connect to it.

The emergency location tracking system 100 in this example is used in the context of an emergency situation. Some of the computing devices 102 are owned and used by users of the emergency situation, some of the computing devices 102 are owned and used by emergency services to assist in locating users, and some computing devices 102 are owned and used by third parties.

Emergency situations may be any one or more of the following situations (non-exhaustively):
fire,
flood,
bomb threat,
missing person(s),
shooting,
medical,
earthquake, and/or
other natural disaster.

The computing devices 102 are configured to run an emergency tracking application 250. Examples of the emergency tracking application 250 and the different versions are provided below with reference to FIG. 1.

Figure 2:
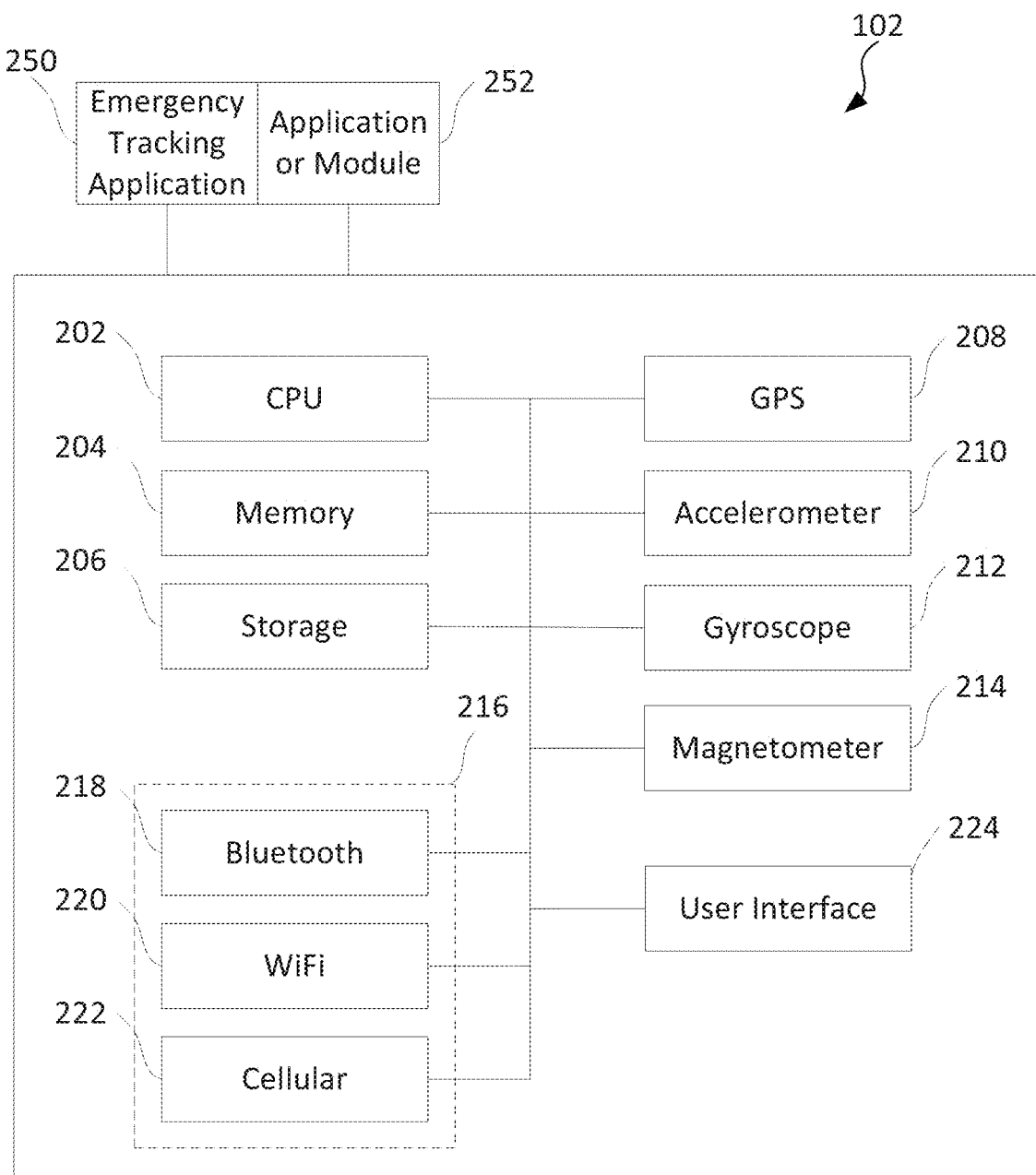
FIG. 2 is a schematic diagram of a computing device.

Referring to FIG. 2, the computing device 102 comprises a CPU 202, memory 4, storage 206, GPS 208, accelerometer 210, gyroscope 212, magnetometer 214, communication interfaces module 210, Bluetooth® 218, Wi-Fi® 220, cellular 222, and user interface 224 in communication with one another via a communication bus.

The CPU 202 is a computer processor, e.g. a microprocessor. It is arranged to execute instructions, e.g. in the form of computer executable code, and to process data, e.g. in the form of values or strings, including instructions and data stored in the memory 4 and storage 206. The instructions and data executed and processed by the CPU 202 include instructions and data for coordinating operation of the other components of the computing device 102, such as the communication interface module 216 and the user interface 224. They also include instructions and data for running applications on the computing device 102.

The memory 204 is implemented as one or more memory units providing RAM for the computing device 102. In the illustrated embodiment, the memory 204 is a Dynamic RAM (DRAM) memory chip integrated on a motherboard of the computing device 102 alongside the CPU 202. However, in other embodiments, the memory 204 is provided differently, for example in an integrated package with the CPU 202 or as plug-in memory unit. The memory 204 is arranged to store the instructions and data executed and processed by the CPU 202. Typically, only selected elements of the instructions and data are stored by the memory 204 at any one time, the selected elements defining the instructions and data relating to the operations of the computing device 102 being carried out at the particular time. In other words, the instructions and data are stored transiently in the memory 204 whilst some particular process is handled by the CPU 202.

The storage 206 is provided integrally with the computing device 102, in the form of a non-volatile memory. The storage 206 comprises a memory unit, usually including a Read Only Memory (ROM), flash memory and or a cache memory, integrated on the motherboard of the computing device 102. Removable storage (not shown) is also provided, although this is optional. The removable storage is again a non-volatile memory, typically in the form of a micro Secure Digital (SD) card or some other portable flash memory device. The storage 206 and removable storage are arranged to store the instructions and data used by the computing device 102. The storage 206 and removable storage stores the instructions and data permanently or semi-permanently, e.g. until overwritten. Typically, the elements of the computer instructions and data stored by the storage 206 and removable storage comprise instructions and data essential to basic operation of the computing device 102, as well as instructions and data relating to applications installed or installable on the computing device 102, including those that perform the methods described below.

The communication interface module 216 comprises short-range wireless communications interfaces 218, 220, and a cellular radio communications interface 222, and is coupled to an antenna (or antennas). The Bluetooth® interface 218 is configured to establish Bluetooth® short-range wireless communication links 112. The Bluetooth® communication links 112 are, for example, for connection with other computing devices 102. The Wi-Fi® interface 220 is configured to establish Wi-Fi® short-range wireless communication connection with the Internet 104 via the access point. The cellular radio communications interface 222 is configured to establish the cellular radio communication connection to the Internet 104 using appropriate protocols previously discussed. As such, the communications interface module 216 comprises one or more wireless modems suitable for supporting the different communication connections (see FIG. 1). In another example, the communication interface 216 also comprises a wired communication interface. The wired communication interface may be used to provide a wired communication connection, for example an Ethernet or Universal Serial Bus (USB) connection (not shown), to the access point.

The user interface 224 comprises a display and an input device. In the present embodiment, the display and the input device are implemented together as a touch sensitive screen. The display is a Thin-Film-Transistor (TFT) Liquid Crystal Display (LCD) display or an Organic Light Emitting Diode (OLED) display, or other appropriate display. The input device is a capacitive layer provided over the display, arranged to detect touch by the user. The user interface 224 is arranged to display information to the user under the control of the CPU 202 and to convey input from the user, derived from the user touching the input device, to the CPU 202 via the communication bus.

The computing device 102 comprises a speaker and microphone interface (not shown). The speaker is used to raise alarms in an emergency system. The speaker is configured to convey audio information to the user such as an alarm sound and/or verbal instructions to a user of the computing device.

The GPS 208, accelerometer 210, gyroscope 212, and magnetometer 214 are all sensors (comprising hardware and supporting software to interface with them) that are configured to provide location data (and/or data that can be processed to provide location data, for example integrating acceleration data twice can provide position). The location data of the computing device 102 is important in this system 100. The location data (along with other user information and/or computing device 102 identifying information) is transmitted to the remote server 106 during an emergency. The location data is used with the beacons as described with reference to FIGS. 4A and 4B. Sensor fusion with all (where possible) of the GPS 208, accelerometer 210, gyroscope 212, and magnetometer 214 is used to improve the accuracy of the location data. To further improve the location data, the Wi-Fi® 218, Bluetooth® 220, and cellular 222 modules can all provide further location data. Location data from these modules can also be used as a part of the sensor fusion with the GPS 208, accelerometer 210, gyroscope 212, and magnetometer 214 modules. Occasionally some of the sensors/modules may not provide accurate measurements and therefore are not used in the sensor fusion. For example, the magnetometer 214 may not work in a building with lots of metal surrounding it and/or if there are no Wi-Fi® access points or Bluetooth® beacons nearby with known locations.

Location data can be augmented with map data to improve its accuracy. For example, by taking into account the path of travel and surrounding boundaries. In particular, this is done by training the system to identify collision objects, such as walls, and areas where a user should be able to freely manoeuvre, such as corridors. If the computing device 102 detects that the location is changing, but appears to be passing through collision objects, the system will realign the user to the nearest logical path when collision had occurred, then update journeyed path with the new correction. Alternatively, this processing can be done on the remote server 106 when it receives the location information.

The computing device 102 is configured to run a plurality of software modules and/or applications 250, 252. In particular, an emergency tracking application 250 is a native application configured to run on the computing device 102. The software modules include an operating system, a web browser, and a native application. Optionally the software modules also include a Progressive Web Application (PWA). Each of the software modules comprises a set of instructions for performing one or more functions of the computing device 102. The instructions are provided in the form of computer executable code stored in the storage 206, removable storage 208 and/or the memory 204, and processed by the CPU 202, communication interface module 216 and user interface 224.

In the present embodiment, the computing device 102 is a smartphone whose operating system is an Android® operating system. However, several other operating systems are suitable as alternatives, such as Apple® iPhone® OS (iOS) and Microsoft® Windows® 10. The operating system manages the basic functioning of the hardware of the computing device 102 and operational interactions between the hardware components of the computing device 102 and software modules.

The emergency tracking application 250 is configured to any play any emergency related alarm sounds to a user. The emergency tracking application 250 is configured to do so even if the computing device 102 is in silent mode. In this Android® example, the Android manifest file is used to request permission to modify the audio settings of the computing device 102.

Figure 3:
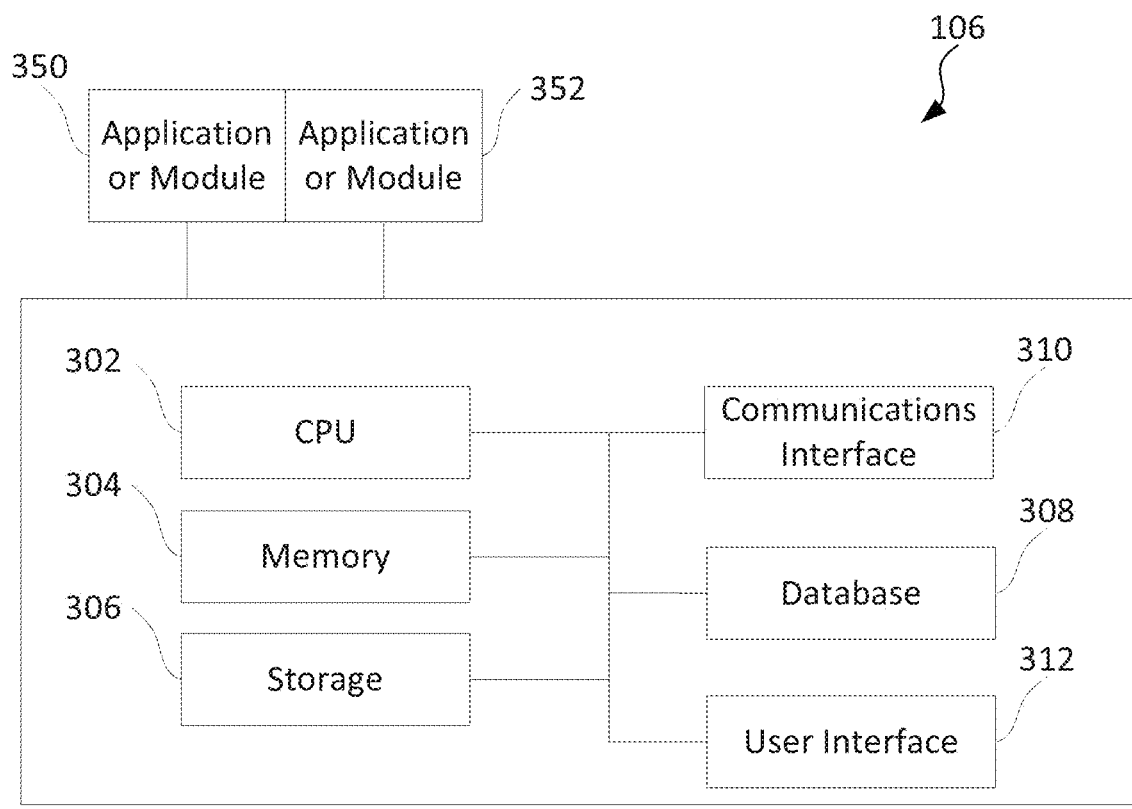
FIG. 3 is a schematic diagram of a server.

Referring to FIG. 3, the remote server 106 comprises a CPU 302, memory 304, storage 306, a database 308, communication interface(s) 310 and user interface 312 in communication with one another via a communications bus.

The CPU 302 is a computer processor, e.g. a microprocessor. It is arranged to execute instructions, e.g. in the form of computer executable code, and to process data, e.g. in the form of values and strings, including instructions and data stored in the memory 304 and storage 306. The instructions and data executed and processed by the CPU 302 include instructions and data for coordinating operation of the other components of the remote server 106, such as the database 108, communication interface 310 and user interface 312. They also include instructions and data for running applications on the remote server 106.

The memory 304 is implemented as one or more memory units providing RAM for the remote server 106. In the illustrated embodiment, the memory 304 is a DRAM memory unit mounted to a motherboard of the remote server 106 alongside the CPU 302. However, in other embodiments, the memory 304 is provided differently, for example as a memory chip integrated with the motherboard or the CPU 302. The memory 304 is arranged to store the instructions and data executed and processed by the CPU 302. Typically, only selected elements of the instructions and data are stored by the memory 304 at any one time, the selected elements defining the instructions and data relating to the operations of the remote server 106 being carried out at the particular time. In other words, the instructions and data are stored transiently in the memory 304 whilst some particular process is handled by the CPU 302.

The storage 306 comprises a hard disk drive or flash drive mounted in the remote server 106 or as a separate storage unit accessible to the remote server 106. The database 308 may be implemented with the storage 306. That is, the database 308 is typically a part of the storage 306, e.g. data stored by the storage. However, in other embodiments, the database 308 is separate from the storage, e.g. comprising a separate hard disk drive, storage unit, virtual server, or physical server. The storage 306 is arranged to store the instructions and data used by the remote server 106. The storage 306 stores the instructions and data permanently or semi-permanently, e.g. until overwritten. Typically, the elements of the instructions and data stored by the storage 306 comprises instructions and data essential to basic operation of the remote server 106, as well as instructions and data relating to applications installed or installable on the remote server, including those that perform the methods described below. The database 308 is configured to store information relating to users that own, or have owned, one or more of the computing device(s) 102, along with configuration information relating to the users and the computing devices 102.

The communications interface 310 comprises a wired communication interface that is configured to connect to the Internet 112. The wired communication interface typically connects to the Internet 112 via an access point, router, and/or switch (not shown) and an Internet Service Provider (ISP), for example via an Ethernet or Universal Serial Bus (USB) connection (not shown), and a suitable modem.

The user interface 312 comprises a display and an input device. In the present embodiment, the display is a computer monitor and the input device is a keyboard and mouse. Alternatively, the user interface 312 can be considered a web interface provided by the remote server 106 via the communications interface 310. This web interface is discussed in greater detail in the examples below.

The remote server 106 is configured to run a plurality of software applications or modules 350, 352. The software modules include an operating system and a web server. Each of the software modules comprises a set of instructions and data for performing one or more functions of the remote server 106. The instructions, e.g. provided in the form of computer executable code, and the data, e.g. in the form of values or strings, are stored in the memory 304 and storage 306, and executed or processed via the CPU 302.

In the present embodiment, the operating system is a server optimised operating system, such as those provided by Linux® and Microsoft® Windows®. The operating system manages the basic functioning of the hardware of the remote server 106 and operational interactions between the hardware components of the remote server 106 and the software modules. In some embodiments, the web server is implemented as part of the operating system, e.g. as a function or module of the operating system. In other embodiments, the web server is an application running on the remote server 106, or even at a remote site under the control of the remote server 106. The remote server 106 is operationally arranged to provide the files for running the PWA and/or native application to the computing device 102, on request. It also provided a portal to manage interactions between the computing device 102 and the database 308.

In the present example, the remote server 106 is provided by Microsoft® Azure @ cloud service and as such has access to various Azure® services as herein described.

The remote server 106 may be configured as one server. Alternatively, the remote server 106 can be viewed as a collection of services coordinated using the Azure® system. The services are configured to run methods similar to that of a server.

Referring again to FIG. 1, the example system 100 is used to locate/track people during emergency situation. Locating and tracking is achieved by showing users' location via their computing devices to key staff/emergency services. In particular, the locating and tracking is conducted during an emergency only.

While the examples provided throughout relate to the emergency tracking application 250 running on the computing devices 102 within the system 100 (and in particular, relating to smartphone applications running on smartphones), it is also possible to access/display the same data on a PC, laptop, tablet and/or other computing device via a website provided by the remote server 106.

As mentioned above the computing devices 102 are configured to run an emergency tracking application 250. The emergency tracking application 250 has a number of different versions depending on the target user. These versions of the emergency tracking application 250 may be provided in a single application binary (and different application code run depending on the account the user accesses the application with), or different application binaries are provided per emergency tracking application 250 version. All versions of the emergency tracking application 250 are configured such that any tracking or display of location/tracking information only works during an emergency.

When an emergency is sounded, the emergency tracking application 250 is configured to show a map of the emergency region and various features of the emergency depending on the user and/or version of the application 250 in use (described in more detail below). Emergencies can be sounded in any number of different locations including hotels, schools, universities, office blocks, apartment blocks, sporting events, stadiums, airports etc. A number of the different data sharing and privacy related features will need to be accepted by the various users in the terms and conditions when installing the application 250.

All users of the emergency tracking application 250 will have the option of selecting themselves to be medically trained "first responders". This is intended for police, fire services, doctors, nurses and any other medically trained account holders. In the event of an emergency all first responders will be notified of an emergency within their location. Depending on the type of incident they have the option of responding to the scene. This is in the event of emergency services not being able to attend/unable to attend quickly, but potential lifesaving help being available. If a first responder is at the scene, that accounts information will be available to the emergency services and displayed as a beacon (as described with reference to FIGS. 4A and 4B). This will enable emergency services/commercial/residential accounts to contact and advise others. This feature is voluntary and all incidents should be approached with caution and due care. If they do not have the correct training they are recommended to wait for further assistance. In the event an emergency is not deemed necessary to alert all users of the application 250 but additional help may be advantageous, the Commercial/Emergency service account user may select to send to emergency services as normal, an additional selection will be made available—inform medically trained users of the application 250. In this instance emergency services will be informed as normal. That sites commercial user accounts will be informed as normal. Any "medically trained" or "first responder" user account will also be informed via the application 250. This is to be used in the event of a medical emergency and medically trained users within the area could help.

All information is stored securely and any transmissions are encrypted.

One version of the emergency tracking application 250 is the "free user" version. Preferably, this version is free for a user to download, install, and sign up to. This free user version is for a user wishing to be tracking in an emergency situation. The free user application is configured to share the location of the computing device 102 to the remote server 106 such that other computing devices 102 within the system can view their location (only if the viewer has the appropriate security and data access). The free user application is further configured to be able to activate an emergency. If the application 250 is not used, a user can still be tracked by their number (if they accept to the terms and conditions thereof) during an emergency. By way of example, a customer staying at a hotel would be informed the hotel uses the system and methods described herein, and asked if they can be tracked during an emergency. If the user did not want to download the application 250, but signed and agreed for their number/location too be used then that number (once added to the commercial user's account) could then be tracked within all of the hotels they've agreed to. The same rule applies to residential accounts.

Another version of the emergency tracking application 250 is the "emergency services" version. This emergency services version is for use by emergency services. The "emergency services" version of the emergency tracking application 250 is configured to allow full access to all accounts within the system 100 and to view all mapping information related to a current emergency and devices within the system 100. In particular the emergency tracking application 250 is configured to see numerous different computing devices 102 and buildings at any time in the event of an emergency. When emergency is sounded, the emergency tracking application 250 is configured to show mapping of the emergency region. The mapping displayed shows the location of all users within the emergency and the building or area in an emergency. The building or area is coloured to represent that it is the one currently experiencing the emergency. The building or area in particular is marked in red. The emergency tracking application 250 is further configured to provide its users the ability to text and/or call one another. Once the emergency tracking application user confirms they are attending a certain emergency this information will be made available to all other emergency tracking application users only.

Further versions of the application 250 are called the "commercial" and "residential" applications. The commercial version is configured to allow the operator to see within an associated commercial property/building and the surrounding area. The tracking optionally extends to cover muster points. The residential version functions the same as the commercial version but is configured for residential properties rather than commercial properties.

The emergency services, commercial, and residential versions of the application are configured to provide a training system to train a user on how to use the various features of the emergency tracking application 250. The emergency services, commercial, and residential versions of the application are further configured to provide a testing system to test how users use the emergency tracking application 250 in a mock emergency situation. The testing is intended to be run alongside any other regular site safety testing such as fire drills. Optionally, testing of the system is allowed to run quarterly. Optionally, the testing is required to run quarterly.

Optionally, when starting the training, the application 250 will present a disclaimer page explaining that his will no activate and/or send a notification/alarm to other users of the application 250 within the emergency region. Further, the disclaimer will note that the emergency services will not be called. With the disclaimer acknowledged, the application 250 will function as if an emergency was ongoing but while also indicating this is in a training mode (via a ghost writing "TRAINING" in the background of the user interface). Users will be able to generate an emergency report and alarm as herein described (without raising the alarm). By providing training, the users of the application 250 will be less likely to make mistakes and feel more comfortable for when it comes time to using the application 250 in a real-world situation.

The different versions of the application 250 will be accessed depending on the type of account a user has. If the user is an emergency service worker, then they will use the emergency service worker version of the application 250. If the user owns, operates, or otherwise manages a commercial building or part of a commercial building, then they will use the commercial version of the application 250. Similarly, for a person that manages aspects of a residential property, they will use the residential version of the application. Finally, if the user is a non-emergency worker and does not manage any aspects of the property, they use the free user version of the application.

Figure 4A:
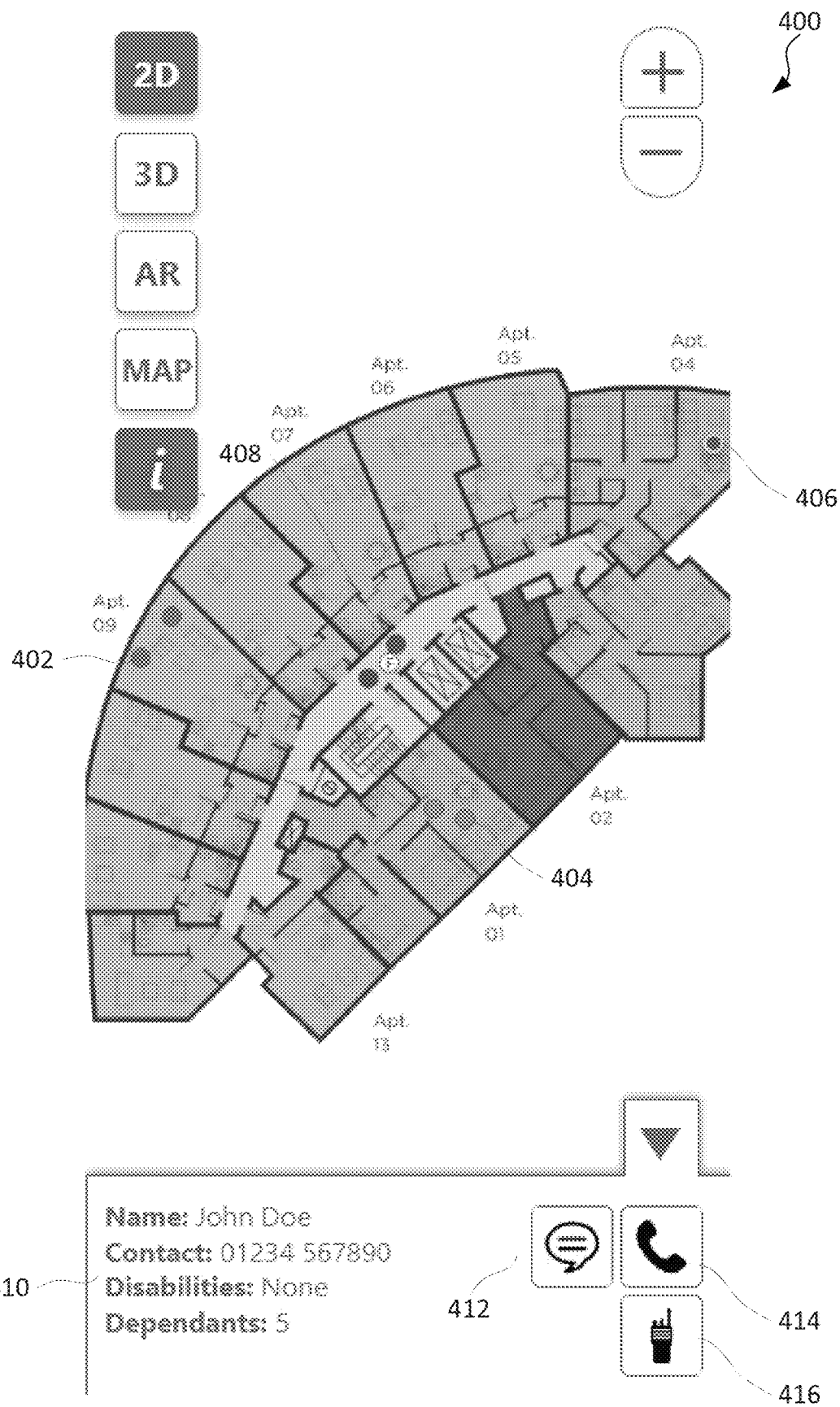
FIGS. 4A and 4B are example user interfaces of building layouts.
Figure 4B:
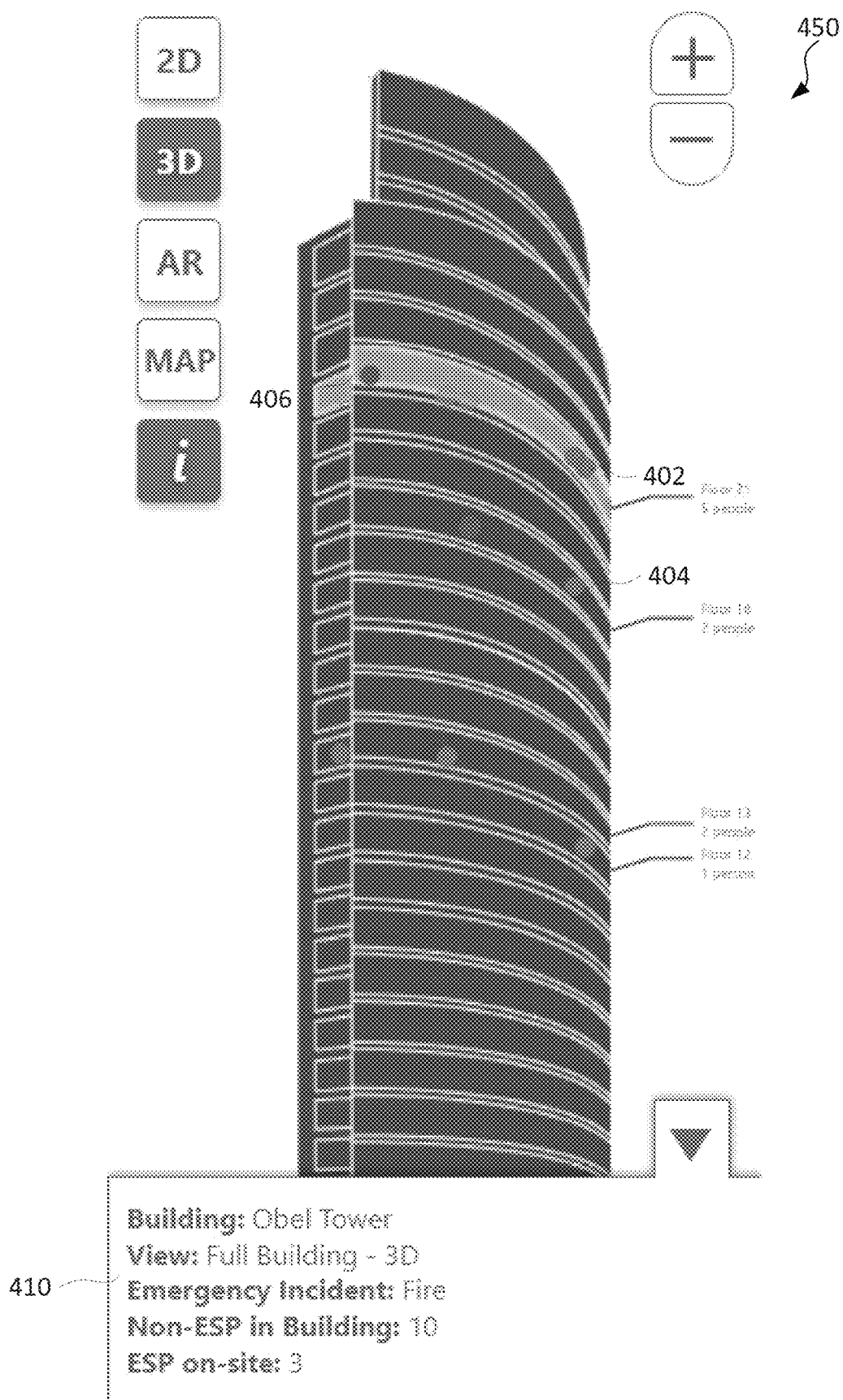

Referring to FIGS. 4A and 4B, example user interfaces 400, 450 of the emergency tracking application 250 is shown relating to an example emergency situation involving a building. The emergency tracking application 250 is configured to provide a 2D, 3D, and/or augmented reality views of the building. The interfaces 400, 450 are configured to show all emergency exits of a building. The emergency tracking application 250 receives site data to display the mapping and/or building information on the interface. Preferably the site data comprises data for showing 2D, 3D, and/or augmented reality views of the building and/or area associated with the ongoing emergency. Site data is also described herein as mapping data.

FIG. 4A shows example 2D display 400 and FIG. 4B shows an example 3D display 450. Also displayed is the number of people within the building. As people exit the building, this number is updated accordingly. A record of the number of people exiting the area may be taken, and their contact details may be noted (to facilitate their being contacted at the end of the emergency situation). The emergency tracking application 250 is configured to provide the option to display the number of people on each floor or per room. Providing this layered level of detail allows emergency services to prioritise where to put their resources. Beacons 402, 404, 406, 408 on the views of the building are used to indicate where people are in a building or location and how many people are at each location. The beacons 402, 404, 406, 408 show the users' computing devices 102 last known location. The last known location of the user's computing device 102 should ideally match the last known location of the user. Optionally, the beacons 402, 404, 406, 408 also comprise a visual aid to show the direction the user is travelling. The visual aid is preferably an arrow pointing out of the beacon 402, 404, 406, 408.

The beacons 402, 404, 406, 408 are coloured depending on their status. In this example, the green beacon 402 indicates that the user is moving and/or currently using their computing device 102. This is an indication that the user less likely to be in trouble. The orange beacon 404 indicates that a user has not moved or interacted with the application in a last time threshold. The red beacon 406 indicates that a user has not moved or interacted with the application for more than the time threshold. Preferably, the time threshold is between 30 seconds and one minute. A user may also select their own status to be displayed. The blue beacon 408 indicates the user is an emergency service worker. Preferably the blue beacon is augmented to show the sort of emergency worker the emergency worker is. Preferably, this augmentation is that the beacon 408 comprises a letter corresponding to the type of emergency service work. For example, the beacon 408 flashes "F" for fire service, "P" for police, and "A" for ambulance. Optionally the beacon flashes on and off to show that it is an emergency worker. Optionally, the beacon 408 will change colours similar to that of the other beacons 402, 404, 406 if the emergency worker is not moving similarly.

The beacons 402, 404, 406, 408 may comprise further information to indicate that the user has additional people with them that do not have a computing device 102 and/or do not have the emergency tracking application 250 installed on their computing device 102. Preferably the beacon 402, 404, 406, 408 will comprise a super script numeral showing the additional number of people present. For example, the beacon has a super script "+1" to indicate that there is 1 additional person (and "+2" for 2 etc.).

The beacons 402, 404, 406, 408 are live updating. The remote server 106 continuously receives updated location information from the users of the application 250 as to the location of their computing devices 102 (and therefore the location of the users themselves).

FIG. 4A shows the interface when interacting with a beacon 402, 404, 406, 408. By interacting with any of the beacons 402, 404, 406, 408, a user can view user account information in the display section 410. The user account information can comprise any one or more of the following:
    name of the user of the computing device 102,
    phone number(s) of the computing device 102,
    any disabilities of the user or of people with the user of the computing device 102,
    number of additional people in the user's care and/or without a computing device 102 with the emergency tracking application 250 installed, and/or any additional information that may be relevant provided by the user such as their current medical condition.

User account information relating to an emergency service worker beacon can additionally comprise any one or more of the following:

name of the emergency service they work for (fire, police, etc.), phone number of the computing device 102 and/or radio channel of emergency worker equipment, and/or whether they are armed or unarmed.

Only some of this user account information may be available depending on what the user has provided to the system.

The emergency tracking application 250 is configured to provide an icon to text 412 and an icon to call 414 the computing device 102 associated with the beacon currently being interacted with. The emergency tracking application 250 is configured to start an emergency services call (to 999, 911, 111, or whatever the emergency services phone number is in the current country) when the emergency services call icon 416 is interacted with.

FIG. 4B shows the interface when not interacting with an beacon 402, 404, 406, 408. The display section 410 displays information relating to the building, the emergency, the number of emergency personnel on site, the number of non-emergency personnel on site.

It is possible to move between the different interfaces 400, 450 by interacting with the map presented. For example, if on the 3D view 450, interacting with one of the floors will change into the 2D view 400 of the floor.

Figure 5A:
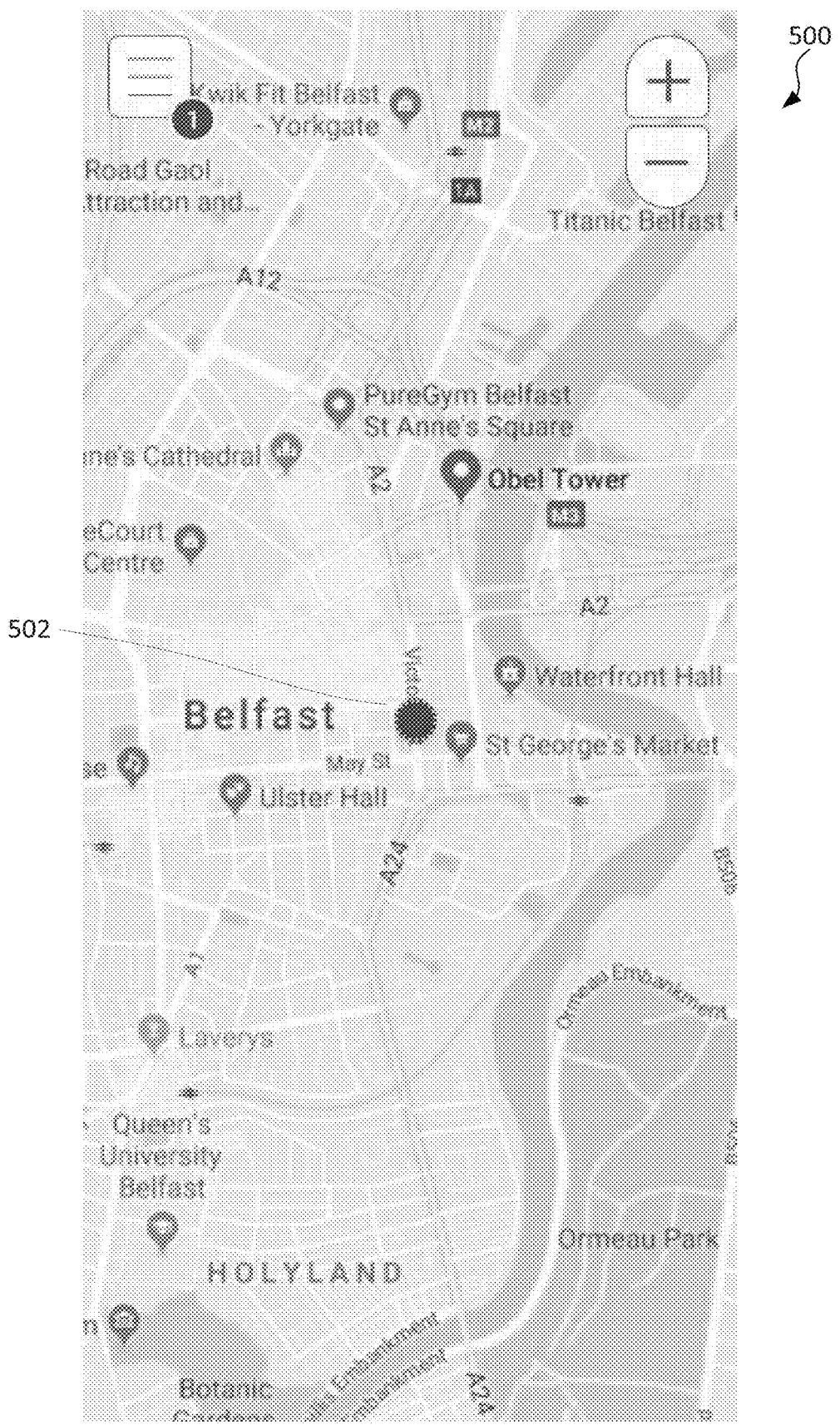
FIGS. 5A and 5B are example user interfaces of map views.
Figure 5B:
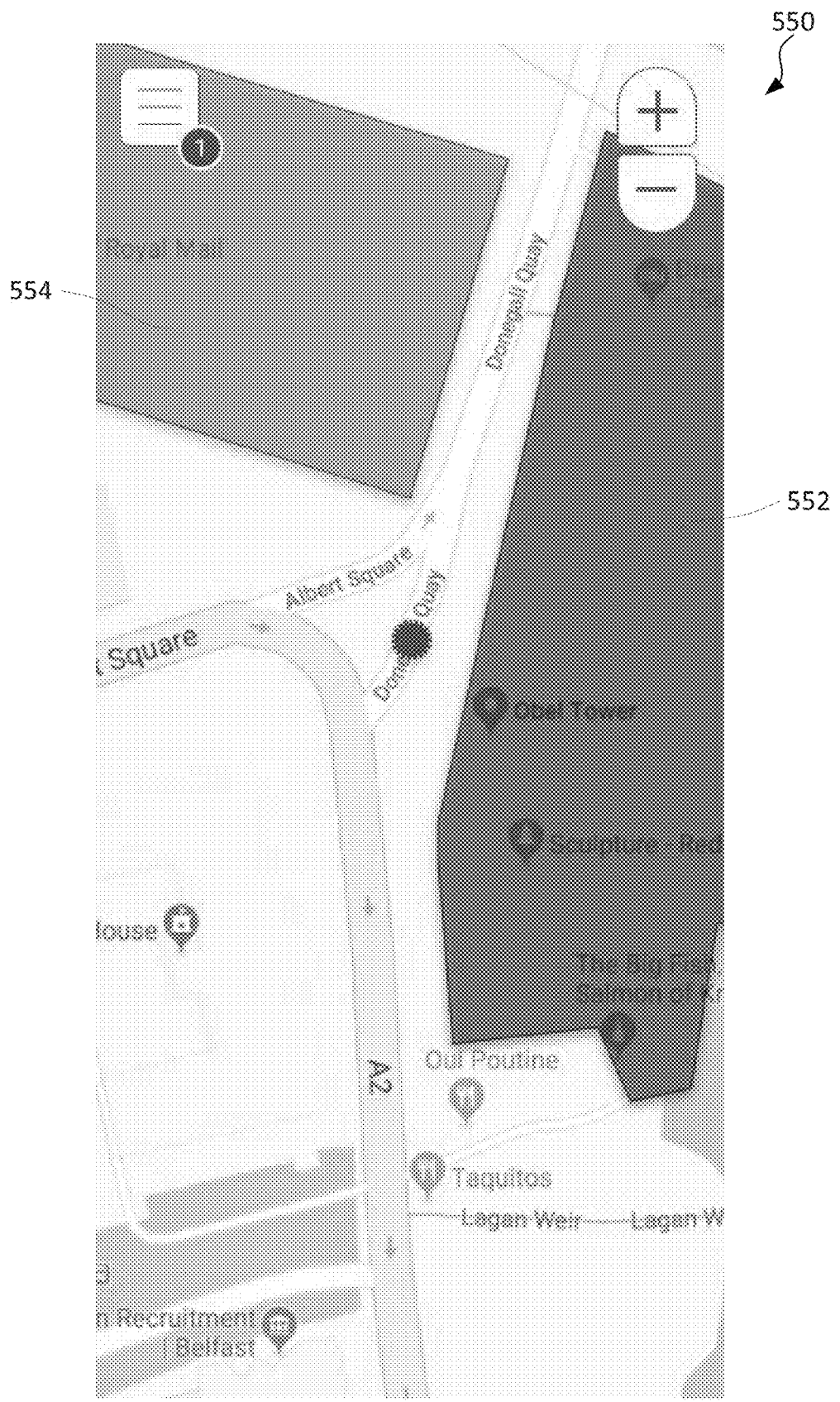

Referring FIGS. 5A and 5B, example user interfaces 500, 550 of the emergency tracking application 250 are shown. The user interface 500 of FIG. 5A shows the point at which an emergency is occurring through the use of a location beacon 502. By interacting with the location beacon 502 and/or zooming in using regular map interaction techniques, the more zoomed in user interface 550 of FIG. 5B is presented. This user interface 550 of FIG. 5B shows a coloured area 552 where an emergency is occurring. The emergency area 552 is coloured red to show separate it from the other buildings/areas 554 in the map.

The following section provides alternative and supplemental descriptions of example user interfaces and features used in the user interfaces of the various application 250 versions as described herein.

Home Page:
  Beacons of personnel within 2D/3D/AR building
  Picture of building, beacons moving as people move within building.
  List of people within building—can be changed to list of people within each floor, list of people within each room.
Remote Access:
  Will show ID and ask to re submit password
  Request button will generate new (remote access) password. (provides new password active for 5 min).
  All apps will have "remote access" option. Adding a ID and remote access password will give access to the emergency information.
Beacons:
  Show direction of travel (Automatically)
  Colour of beacon will show:
    Green—person is moving
    Amber—Person has not moved for between 30 sec/1 min
    Red—person has not moved for more than 1 min
    Blue flashing with red F (Not flashing)—Fire fighter
    Blue flashing with blue P (Not flashing—Police Officer
    Blue flashing with Amber A (Not flashing)—Ambulance staff
  Clicking on beacon will show individual details—
    Name
    Phone number
    Disabilities
    Number of personnel under their care/or without smart phone i.e. No 2, Age 4, 2.
    Call (direct radio call to number)
    Text, Individual/all
    Text individual (by clicking on that individual, choose text option)
    Call individual (by clicking on that individual choose call option)
    Text—Option individual—choose individual—write text—send. Can also be done by clicking on the individual beacon and going through same process
    Call all—Option individual—choose individual—write text—send.
  Can also be done by clicking on the individual beacon and going through same process
  "Information" Will Show Information Regarding the Number of People within the Building Name:
    Incident
    Total number of personnel
    Number of personnel without smart phone
    Number of emergency services
    Number of personnel not moved in over 1 min
    Text, option to text one or all persons within building
    Call, option to call individual or all persons within building
    ON/OFF switch, this information can be permanently on home screen or just within this tab. If the tab is off the information will only show when the beacon is clicked. If the switch is on (All information shown) when clicking on a beacon it will display that one person's information on the side of the screen for ease of reading.
My Settings
  ID—Shows that apps ID,
  Option to change password after entering current password.
  Building—takes you into a building screen to create a building 2D/3D/AR 2D, 3D, AR options for home screen
Add Incident
  Will allow the user to add an incident to a specific room/area using icons within the (Incident file) app. This is to help emergency services attending have a better understanding of the situation and also prevents disorientation while within a building by showing the location of the emergency.
Lock
  Will stop the phone from rotating the view automatically
Clicking on Beacon
  Will give drop down menu providing further information. Depending on if that is personnel or emergency services. (As previously displayed).
  Will also give an option to call/text that person.
Double Click
  The screen will convert from 2D/3D/AR into floor level view. User will then have the ability to navigate as they walk through the building. Scrolling up or down will move to the mapping of the floor above or below.
Opening the App Confirm Emergency On opening the application 250, the user will be asked to confirm emergency (Swipe from NO/YES). The following screen the user will be asked to click Type of emergency— A picture of the type of emergency required will be placed at the location of the scene (Selected within this process).

Emergency Services Required

Select the type of service required—Police, Ambulance etc. (user is not limited to one, also an option for ALL). Following this the user will then choose from the best option to decide the emergency or click other and type in manually.

Confirm you are at the scene of emergency Yes/No. Yes, users address and commercial/Hotel/University ect details have been pre saved during set up stage. No, option for mapping or contacts as described herein. When mapping, the users can zoom in and select area/building. When using a contact, the users can scroll through contacts and that persons last known location (application 250 users), will be used as the scene of emergency.

This information will be sent directly to emergency services. The entire process should take no longer than 10 seconds and therefore saving valuable time.

If a user (NOT administrator, described in more detail below) alarms an emergency, the administrator within that building will be informed that an emergency has been sounded. The emergency services within the area and within HQ will also be informed automatically. A 999 call will also have already been sent.

Training

Accounts will be asked to confirm Use the app for training purposes only—No emergency call will be placed; no emergency services will be informed. Confirm you would like to use the app for training purposes only.

User will then be able to go through the emergency call procedure as normal and use the app as if it was an emergency—During a fire drill.

In the Event of an Emergency

ALL users within immediate vicinity of the emergency building/area will be sent a message and map. The map will display the location of the emergency and the current location of the user along with a brief description of the emergency, i.e. fire. No confidential information will be passed. In the event of shooting an audible alarm will be pre-set and recommended, (volume and type of alarm is adjustable).

Referring to FIGS. 6A, 6B, 6C, 6D, 7A, 7B, 7C, 7D, and 8, example application 250 flows are shown. These application flows are exemplary interface steps. A person skilled in the art that other interface flows may also be possible to extract and/or display the required information from/to the user.

Figure 6A:
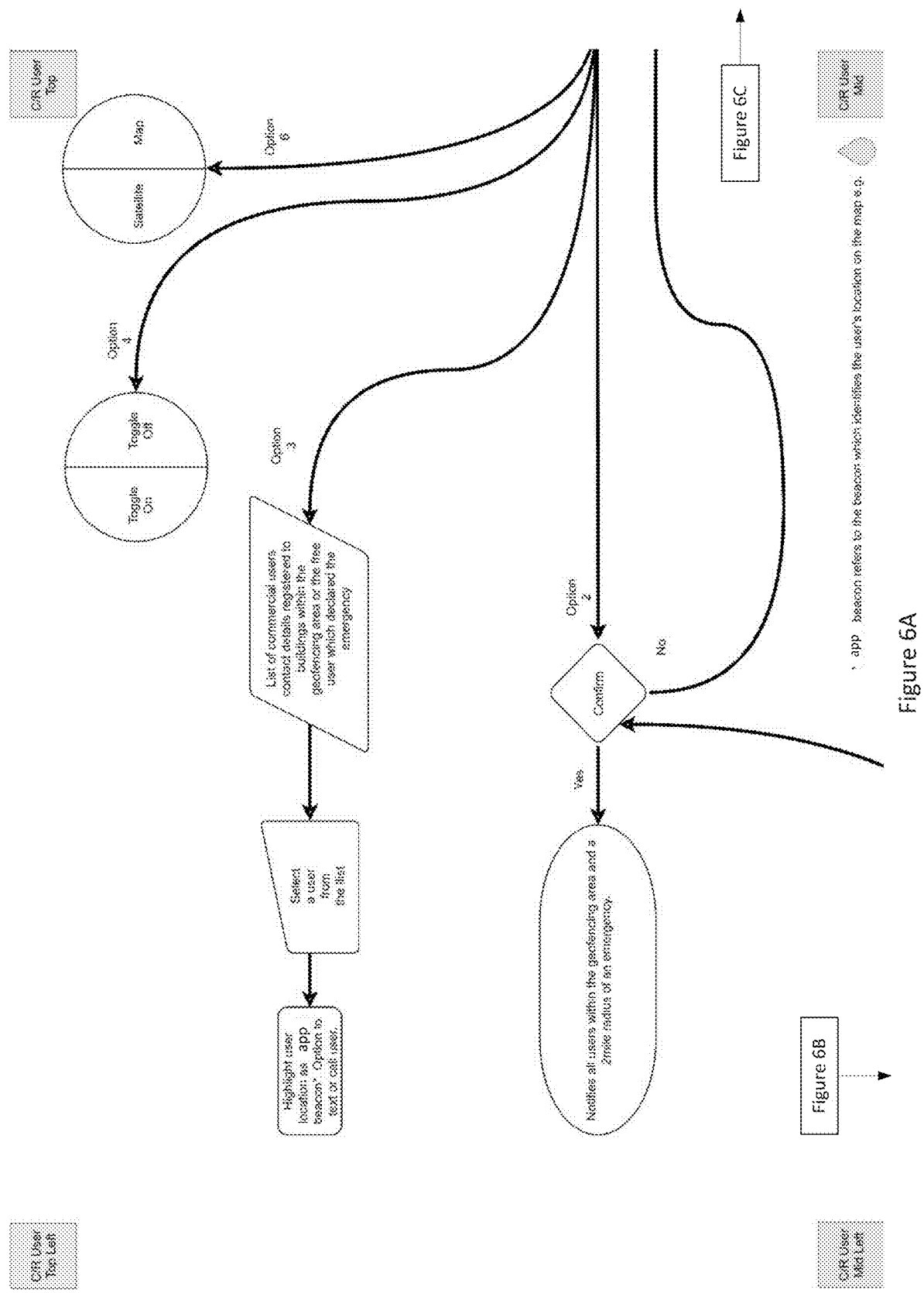
Figure 6B:
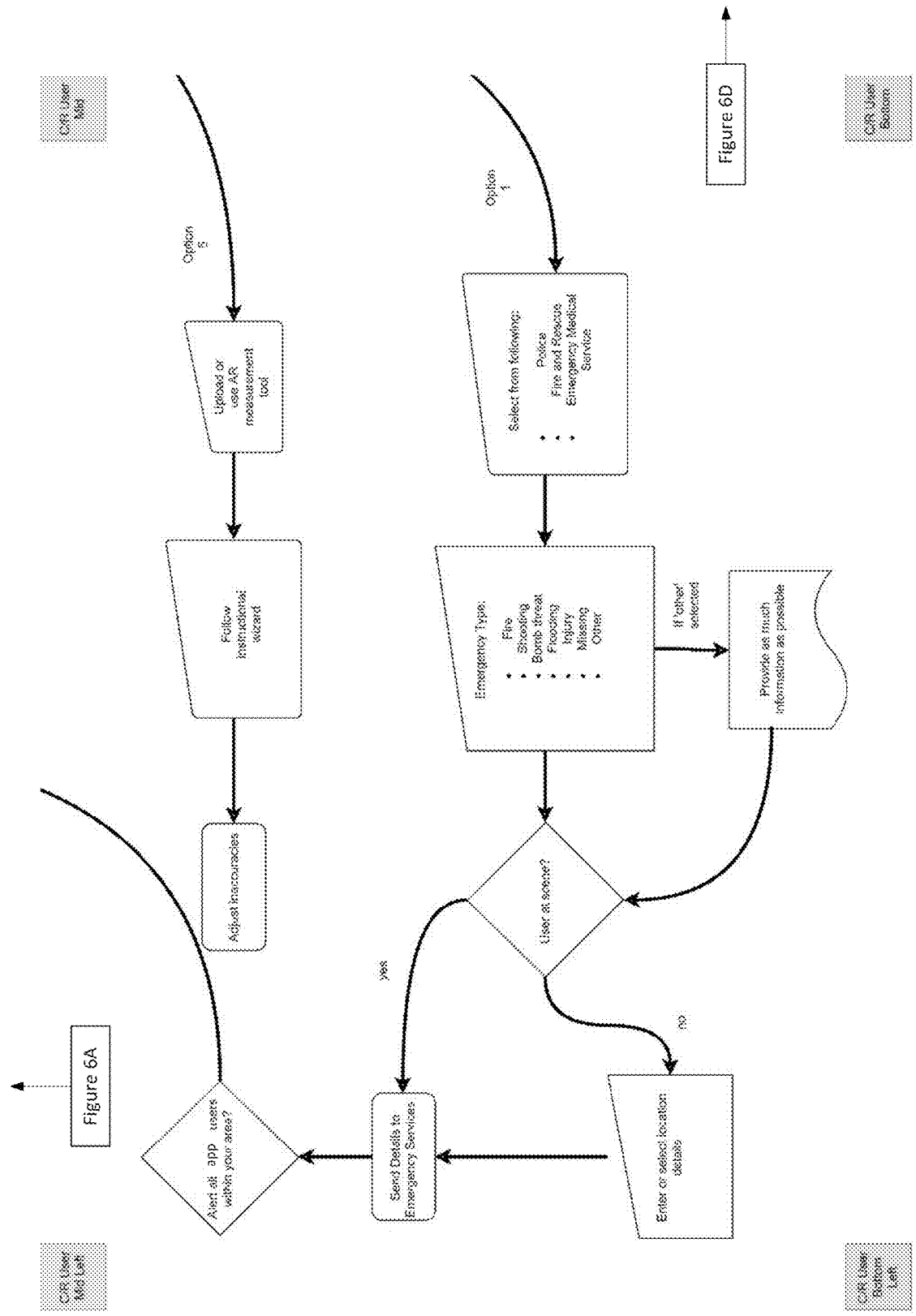
Figure 7B:
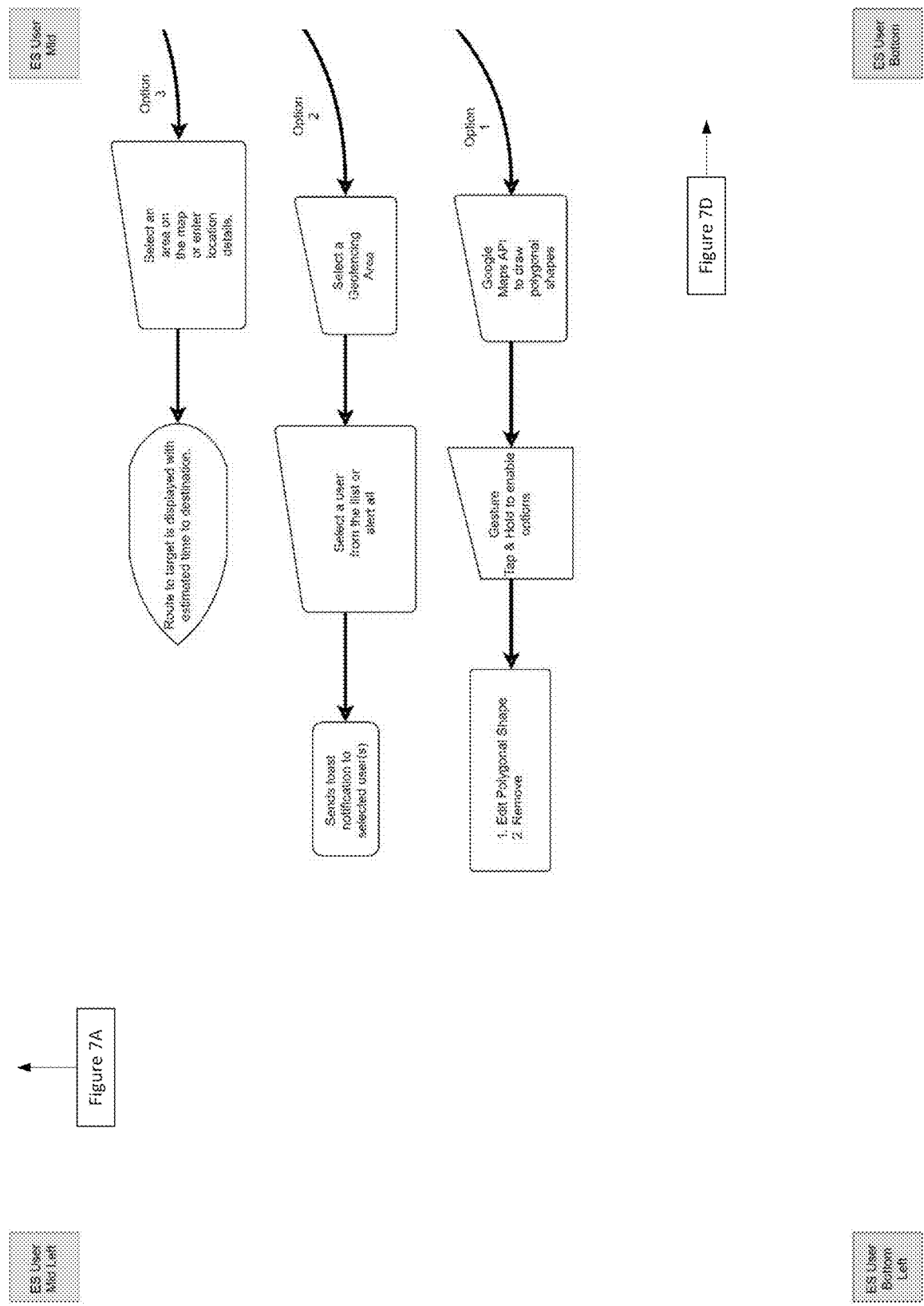
Figure 7D:
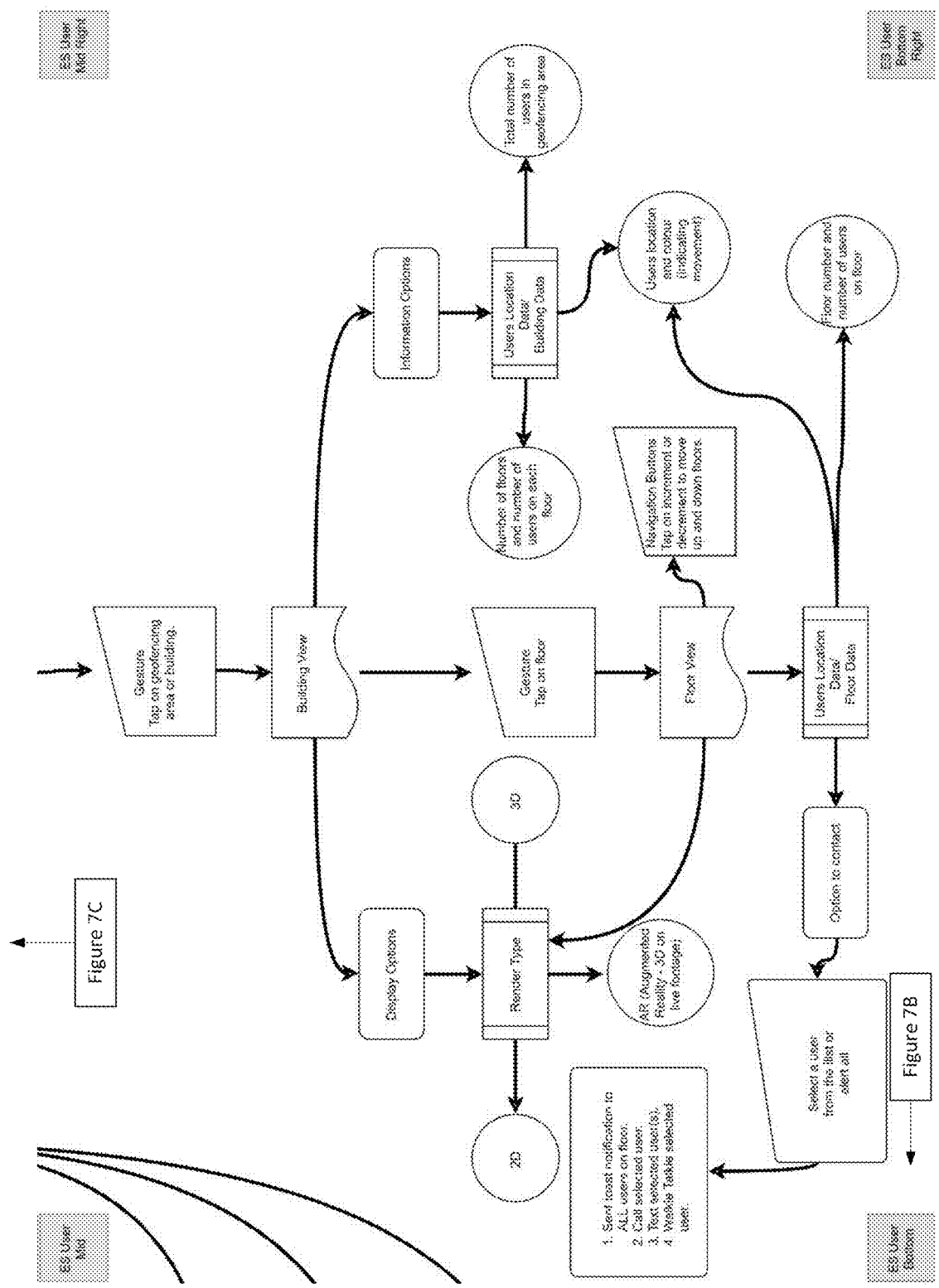
Figure 8A:
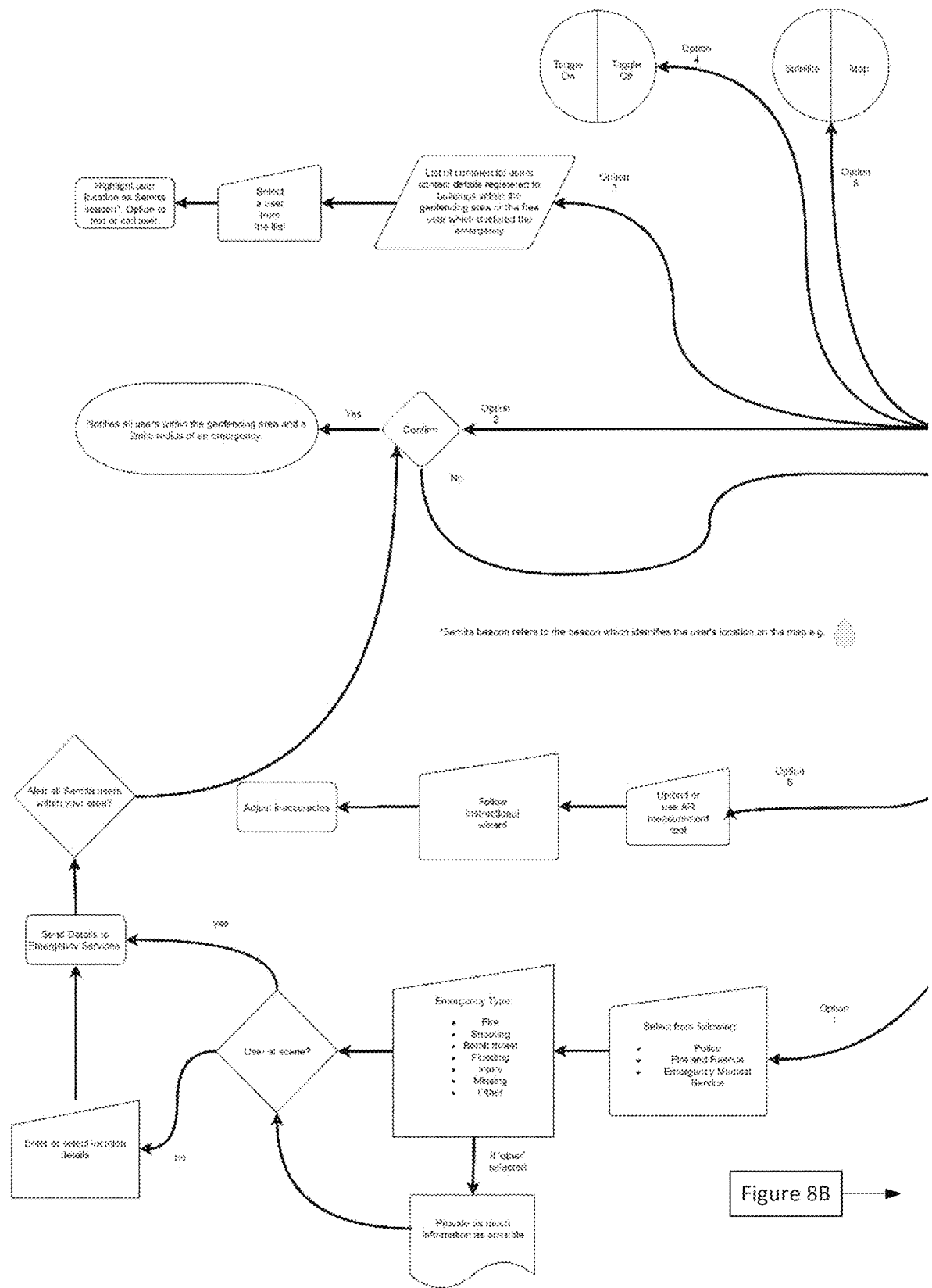
FIGS. 8A and 8B are an example application flow diagram of another further example version of an application.
Figure 8B:
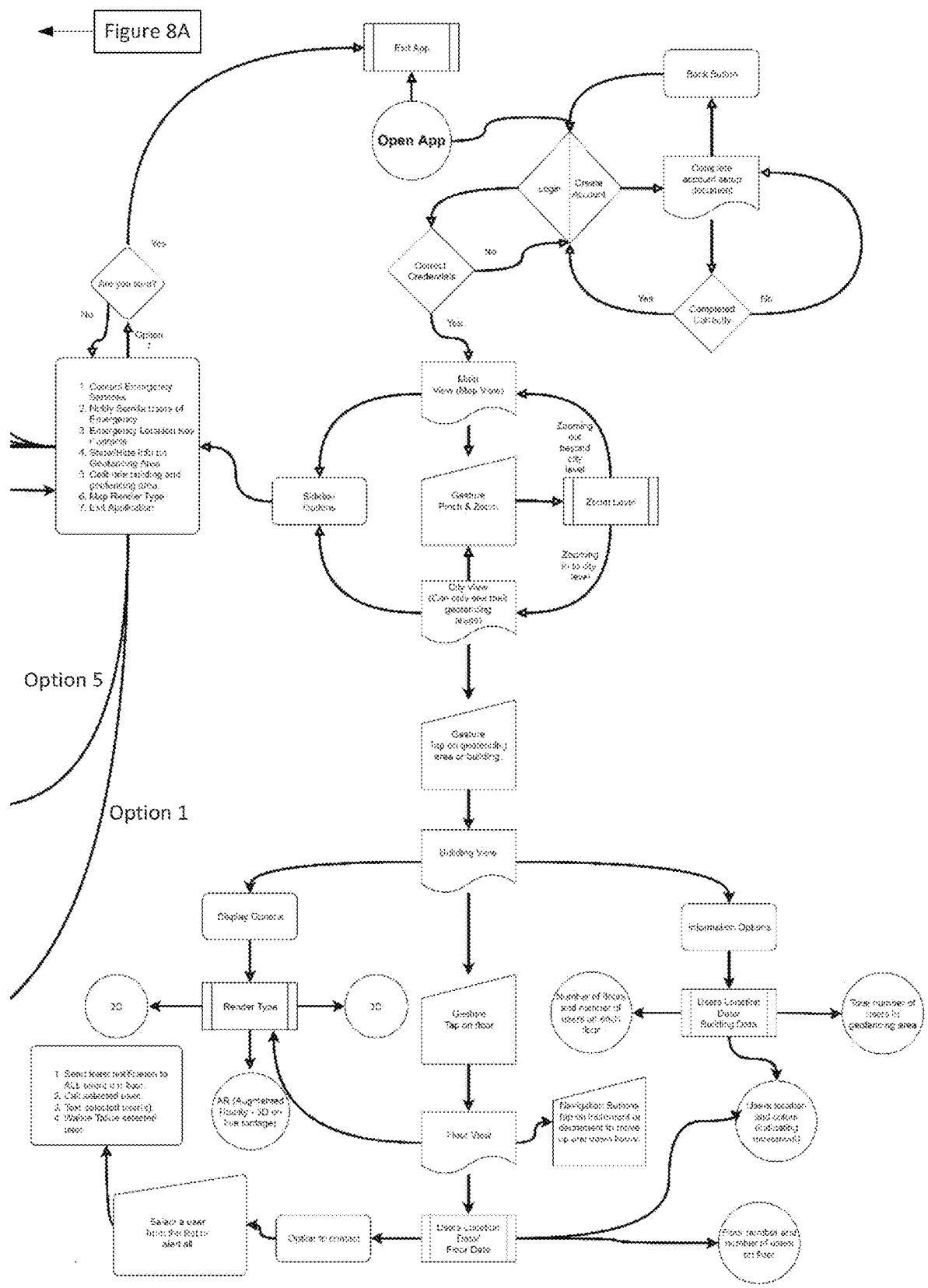

FIGS. 6A, 6B, 6C, and 6D show details of an example commercial or residential application flow. FIG. 6A shows the left right portion, 6B shows the bottom left portion, 6C shows the top right portion, and 6D shows the bottom right portion of the application workflow. FIGS. 7A, 7B, 7C, and 7D show details of an example emergency service application flow. FIG. 7A shows the left right portion, 7B shows the bottom left portion, 7C shows the top right portion, and 7D shows the bottom right portion of the application workflow. FIGS. 8A and B shows the overall free user version of the application flow.

Where reference is made to where the emergency location application 250 is configured to carry out or undertake any steps, a person skilled in the art will understand that it the emergency location application 250, when executed by CPU 202 of the computing device 102, causes the computing device 102 and/or the CPU 202 of the computing device 102 to carry out or undertake the step. Similarly, the same applies with any application running on the remote server 106.

Referring specifically to an example commercial and residential versions of the emergency location application 250 now, after logging in commercial and residential users will be presented with the user interfaces 400, 450 of FIGS. 4A and 4B as the main interface (after logging in) and as such be able to see all of the data associated with these interfaces such as the user account information.

Optionally, the commercial and residential application the commercial or residential user the ability to upload a 2D, 3D, and/or augmented reality layout of the building and/or area the user manages. The layout is uploaded to the remote server 106. This process is described in greater detail with respect to FIG. 9.

For each commercial building, at least one commercial user is nominated an administrator. The administrator optionally has the ability to report an emergency when opening the emergency location application 250. In other examples, all commercial users can report emergencies. Commercial and residential accounts can selectively add or remove which users are considered "administrators".

In another optional example any commercial user can report an emergency. The process of reporting an emergency begins with generating an emergency report. The emergency report can also be considered a "user activated alarm". Where reference is made herein to a "user activated alarm" or emergency report, a person skilled in the art will appreciate that these are the same thing. A "user activated alarm" or emergency report may result in an alarm being triggered as descried with reference to FIG. 14.

An example of generating an emergency report if a fire is within the building is provided in the following paragraphs. This example relates to a commercial version of the application 250 however the residential version is nearly identical except for the fact the building involved is a residential one rather than commercial. The administrator user opens the emergency location application 250, logs in (optionally automatically, this is discussed further in relation to the log in screen), and either reports or confirms (if someone else has reported a fire in the building) that there is an emergency and what sort of emergency it is (through the use of a drop down menu system). Once confirmed, the assistance required is selected using a check button interface (or any similar interface that allows a user to select multiple options). A non-exhaustive list of the options for assistance types are:

fire stations,
police,
armed response,
ambulance, and/or
other.

If the commercial user is at the scene of the emergency, the emergency location application 250 takes their location as the location of the emergency. If the user is not at the scene, the user has the option of providing the location via a map interface and/or via selecting a contact that they know is at the scene currently. The location of the contact will be retrieved or received. A specific room within the building is also possible to select.

Finally additional text or voice notes can be added to the emergency report. The emergency report is transmitted to the emergency services. This transmission of the report, in a preferred embodiment, is as an automatically generated call to the local emergency phone number (999, 911, 111, etc. depending on the country/region). By being automatic the call can be carried out without the user interacting so that they are free to deal with the incident as appropriate. Alternatively or in addition, the emergency report is sent to the remote server 106 such that emergency service users of the application 250 can view the report.

When an emergency is activated via the commercial version of the application 250, an option to inform either all other users (including free users) of the application 250 or just other commercial users of the application 250 is possible. This option is only used with certain types of emergency (for example if a fire is declared, the commercial user has no option). If a medical emergency is declared however, the commercial user may believe this does not require all users of the application 250 within the emergency region be notified and therefore would select not to alarm all other users.

Optionally, the option for a quick report to be generated for when the user does not have the time to complete a full emergency report is presented. In the quick report case, the user confirms there is an emergency and a call to the emergency services is placed. The location used is the user's current location. The call is directed to the police service as a default and is automated as described with reference to the regular emergency report.

Referring specifically to an example emergency services version of the emergency location application 250, the emergency services version of the application 250 provides an interface to allow users to confirm their identity within an emergency service (for example by confirming their badge number and the associated police department).

The emergency services version of the application 250 has the ability to provide building plans during an emergency using the same or similar interface 400, 450 to the interface as described with reference to FIGS. 4A and 4B. All building plans created by commercial or residential accounts are available to emergency services version of the application 250. Further, the emergency services version of the application 250 is configured to provide access to any account or user information during a confirmed emergency (including commercial, residential, and/or free user account information). This allows emergency service works to have better visual understanding of the building(s), personnel inside and surrounding the area of the building(s), track users, guide other emergency service workers through the building(s) and surroundings and have a better overall understanding of the situation.

In addition to displaying the location of the emergency service workers beacon 408, the emergency services version of the application 250 is configured to allow the emergency service user to call and/or text the emergency service worker associated with the beacon. Optionally, the emergency services version of the application 250 is configured to provide the ability for an emergency service worker to message all other emergency service workers. The emergency service user can call and/or text any other emergency service workers prior to arriving on the emergency site as long as they have confirmed they are responding to said emergency.

If the emergency is large scale (such as an earthquake and/or flood), the map of the emergency services version of the application 250 is configured to show more than just one building or region. The emergency services version of the application 250 is configured to allow the user to view and manage the emergency across multiple buildings and divert resources where required. This can be conducted through use of geofencing as described herein. While zoomed out at a multiple building level, the emergency services version of the application 250 is configured to provide totals of the number of people in each building. Once clicked through to a specific building, the interfaces 400, 450 of FIGS. 4A and 4B are provided.

The emergency services version of the application 250 is configured to receive an indication that the user is responding to the emergency and/or responding to a specific location within the emergency. On reception of the confirmation, the interface provides a map with the quickest route highlighted for the user to follow. The map interface as described with reference to FIGS. 5A and 5B is used to show the emergencies.

In the case where multiple emergency reports are received from the commercial, residential, and/or free users, the remote server 106 will filter and/or combine the reports such that only one report is provided to the emergency services version of the application 250 per building. This reduces any clutter on the map interfaces 500, 550 of FIGS. 5A and 5B.

Referring specifically to the free user version of the emergency location application 250 example, upon first opening of the free user version of the application 250, the free user version of the application 250 receives user account information as inputted by the user. This user account information is used to populate the information for any beacon associated with the user account as described above with reference to FIGS. 4A and 4B. The free user version of the application 250 can also receive user account information from the user at a later date if the information changes. The free user version of the application 250 does not provide any way to see other beacons.

The free user version of the application 250 is configured to enable the user to sending emergency reports to the local emergency services. Similar to the emergency report generation of the commercial or residential version of the application 250; the free user version of the application 250 receives information indicative of:

the type of emergency (fire, flood earthquake etc.),
the assistance required (fire station, police ambulance),
injury sustained by the user or someone near them (with some description),
whether the user is at the scene and information about where the scene is (either selection via a map interface or selecting a contact that is at the scene), and
custom text with additional sundry information.

The data is obtained optionally via "option 1" of FIGS. 8A and B. Finally with the report generated, the free user version of the application 250 receives an indication as to whether the user wants to transmit an alert to all other users of application 250 within the building or area. Preferably, the emergency reports are automatically translated to the language of the country the user is currently in (if the language is different).

The report is transmitted to the remote server 106 for processing and/or inspection by the emergency services. The report may also be transmitted to any commercial/residential users of the application 250 so they can assist during the emergency and/or confirm the emergency as discussed in relation to the commercial or residential version of the application 250.

The free user version of the application 250 is configured to display the interfaces 400, 450 of FIGS. 4A and 4B however without any beacons 402, 404, 406, 408 present other than their own beacon. This allows the free users to locate themselves within a building and follow the building plans to the nearest emergency exit (which is also shown on the building plan).

The free user version of the application 250 is configured to receive from the user and then transmit the number of people under the care of the free user and/or the number of people near the user that do not have a computing device 102 installed with the application 250. This information is used to display the beacons as described with reference to FIG. 4A and FIG. 4B.

The free user version of the application 250 is configured to receive from the user and then transmit whether there are any people that require special assistance.

The free user version of the application 250 is configured to transmit location data (i.e. the current location of the computing device 102) every given time period. Preferably the time period is less than 30 seconds. More preferably the time period is less than 15 seconds. Even more preferably, the time period is less than 5 seconds. Optionally, the application 250 is configured to receive a notification. Preferably the notification requires a response within 10 seconds. When the user interacts with the notification, a message is transmitted to the sender of the message to confirm that the user is using their computing device 102. Optionally, the response to the notification comprises further information such as the condition they, or any other people that are with them, are in. If the user does not respond within the required time, then any beacon associated with the computing device 102 will change colour to indicate the most severe state (red in this example). If there is not response, this means the user is either not with their phone or is too injured to respond to the notification. If the user then moves, the beacon will switch back to the normal colour options as described with reference to FIGS. 4A and 4B.

Figure 9:
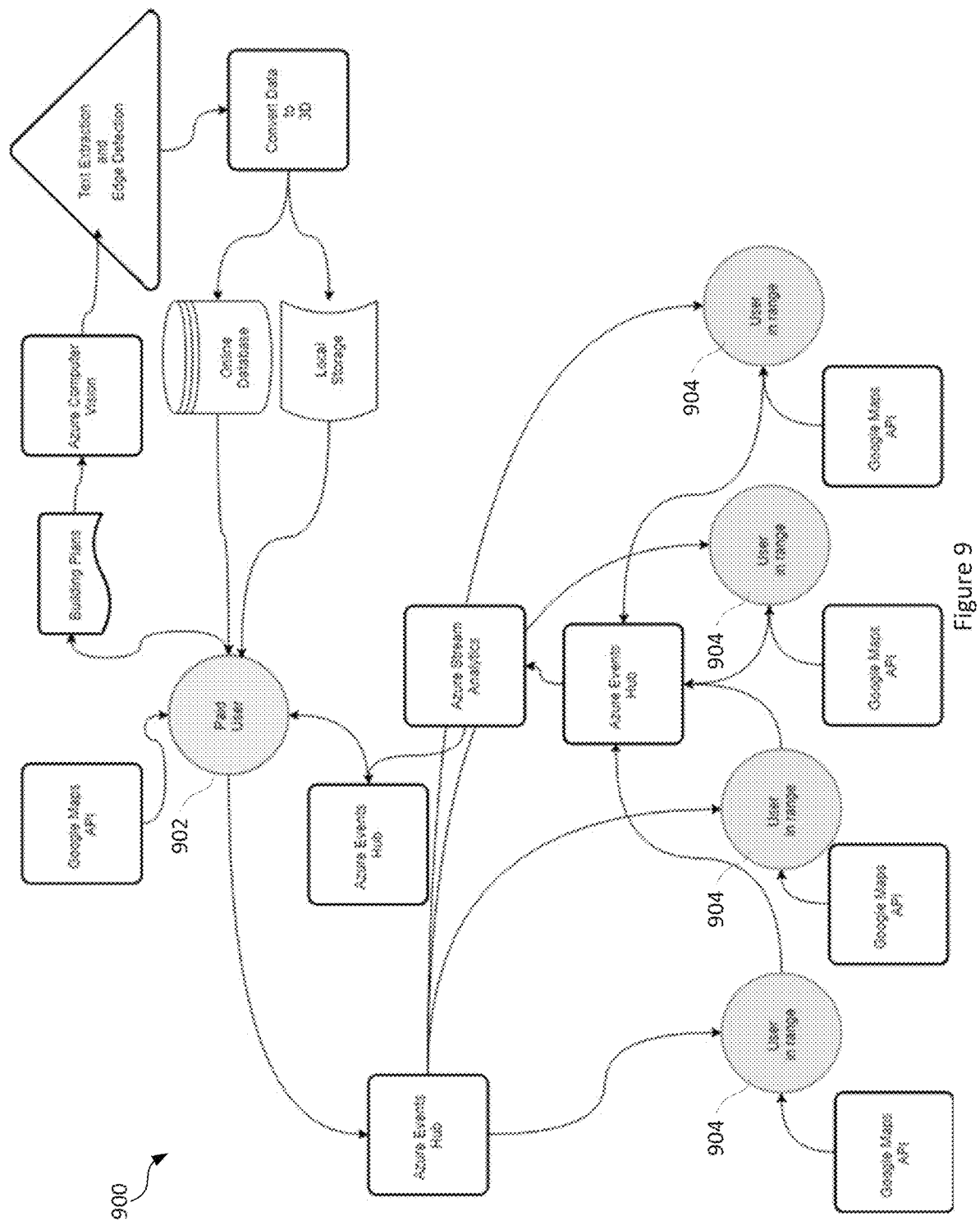
FIG. 9 is a schematic diagram of a communication network.

Referring to FIG. 9, an example system 900 for generating site data is shown and how different APIs and components are structured to communicate with each other. A person skilled in the art will understand that some of the API communication is conducted by the remote server 106 and some is conducted by the computing device 102.

The user is advised on how to input meaningful data such as width, length and height of the area within building plans and/or map to generate the unprocessed site data. The unprocessed data may additionally or alternatively be generated from user provided blueprints. The remote server 106 receives the unprocessed site data in the form of building plans. The remote server 106 is configured to extract bounding box coordinates and text data and convert to JSON files. Preferably, in the example of where site data is building data, blueprint data is used. Further, the remote server 106 uses edge detection on any supplied images. Using edge detection the remote server can find the coordinates of the walls, redraw their edges and vertices, then extrude for a 3D representation. A basic editor is offered so that the user is able to adjust vertices in case the representation needs fine-tuning. Preferably, the editor is part of the emergency location application 250. Alternatively, the editor is a native application or a web based application for use with a web browser.

Also provided, once any blueprints are processed and/or extracted, are methods of mapping the floors of a building to their altitudes. The editor is configured to assist in capturing this information. The editor is configured to allow a user to capture the building locally and using the location sensors of computing device 102 running the editor, a user inputs the level they are on and the altitude currently measured is matched with floor the user is currently on. Optionally and/or additionally, other applications offering augmented reality measuring capabilities are available on the market currently.

Optionally and/or additionally, when uploading building plans, users have the ability to add door codes/entry/exit procedures associated with the building. This can be made visible to emergency services and key commercial user accounts, as specified by the commercial user account administrator.

Optionally, the remote server uses Azure® Computer Vision for the computer vision related tasks. Optionally, Google® Maps data is used to augment and/or enhance the unprocessed site data.

Optionally, the user that is generating the site data has the ability to block out certain rooms. This may be used to remove any sensitive information that is not relevant to the other users that do not use the room.

Currently Google® is working towards mapping the interior of buildings. If/when this data is available, it will be used to augment the site data being generated or already generated.

As an example, in the event of an emergency, the user 902 of the commercial, residential, and/or emergency services version of the application 250 triggers an event. Azure® Events Hub listens for the event and sends a request to all computing devices 102 running the application 250, here shown as "users in range" 904. The request is configured to trigger the application 250 to respond to the request with their current location. With the aid of Google® Maps API and location sensors and/or location sensor fusion (as described with reference to FIG. 2) generated by the computing device 102, the location of the computing device's location 102 is sent back to Azure® Events Hub in order to trigger an event indicating their position is ready to be queried. Azure® Stream Analytics will filter those that are within range of the user's 902 emergency area and/or geofencing area and update an event to display their position on the user's 902 computing device's 102 map interface(s) 400, 450, 500, 550.

Figure 10:
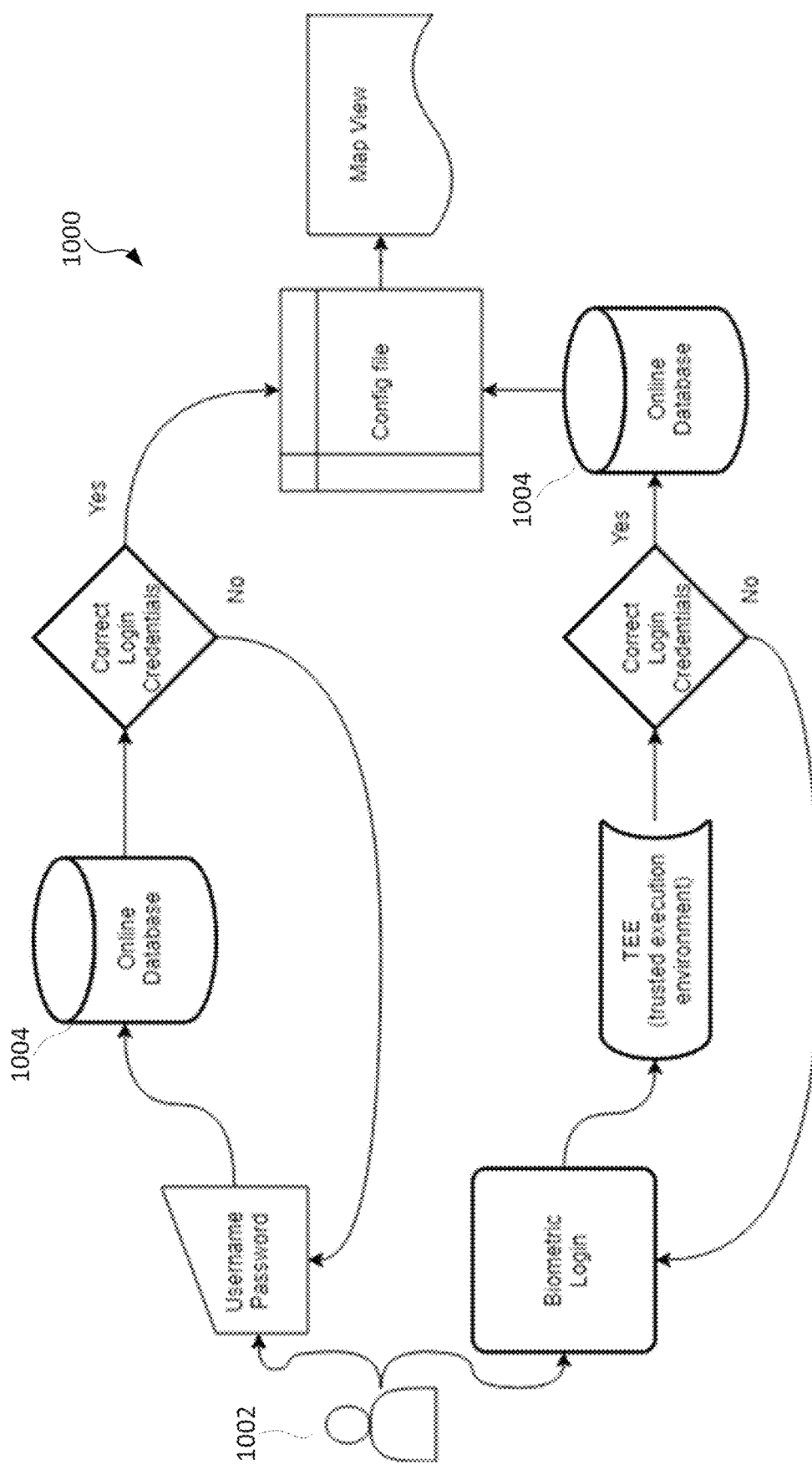
FIG. 10 is a schematic diagram of an example login system.
Figure 11B:
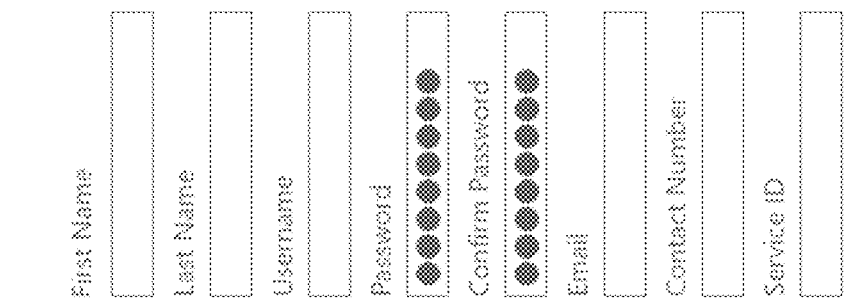
FIGS. 11A and 11B are example login user interfaces.
Figure 11A:
Figure 11A:
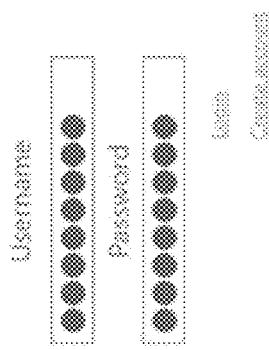
Figure 11A:

Referring to FIGS. 10, 11A, and 11B, an example login system 1000 and interfaces 1100 and 1150 are shown.

When opening the application 250, the user 1002 is presented with the login interface 1100 of FIG. 1100. After the user 1002 enters their login credentials into application 250 running on the user device, the online database 1004 is queried to ensure the correct details are provided. If there are no details, the user is directed to create an account. If a user attempts to log in using their biometrics prior to creating an account, the login will fail as there is not information to be found on the database relating to the user.

When first creating the account, the user 1002 is presented with the account creation interface 1150 of FIG. 11B. The user provides the requested information including username and password. Either now or at a later date, the user can associate their biometric information with their account. In this example, the online database 1004 is a part of the remote server 106 and/or operatively connected to the remote server 106.

The configuration file is used to store any relevant user account information. In particular, this can relate to the type of account the user has and therefor which version of the application will be launched 250 after the user logs in.

Other uses of the configuration file are described below with reference to the data models used for each user.

In a large-scale emergency, the emergency services version of the application 250 is configured to be able to specify different geofencing regions by drawing onto a map interface. The geofencing region is then associated with users of the application 250. Users associated with the geofencing region only receive data that is relevant to that region. In particular, location data of other computing devices 102 within the geofenced region and site data of the sites (including buildings, floors, areas) within the geofenced region are only provided to the users associated with the geofenced region. Alternatively described, the computing devices are configured to selectively receive site data and/or location data based on an associated geofence region. In another alternative way to describe it, there is a method to selectively transmit site data and/or location data based on the receiving computing devices association with the given geofence region.

In one example, a user draws a geofence region that they are to be associated with.

In another example, an emergency services user draws a geofence and assigns other emergency service workers to said geofence. This way, the user that draws the geofence region effectively assigns other emergency service workers to given regions. This allows for better co-ordination and resource allocation at a higher level.

In an addition to the examples or as a separate example, the geofences are predefined when the site data is generated. This way the residential and/or commercial user is able to provide the geofencing data when creating the site data before an emergency occurs.

A map interface similar to the interfaces 500, 550 of FIGS. 5A and 5B are provided to the user to draw the regions. Alternatively or in addition, the user may select a building and use the building as the geofence region.

Geofencing areas can be updated by any of the emergency service worker, commercial and/or residential versions of the application.

Additionally, additional "secondary" geofencing is used to supplement the geofencing as described above. The secondary geofence is an extension of an additional 2 miles around any emergency region reported. Any users within the secondary geofence area are notified of the emergency incident.

Remote access can be given to third parties. A request for data sharing is received. The request is approved by a user of the system. Usually the user is an emergency services worker and/or an administrator of the commercial/residential property. Access is then approved and the third party is allowed to receive the stream of the data.

In allowing the data to be transmitted to the third party, a new random remote access password is generated for use with the third parties identification. The third party identification is preferably an email address of the third party. Optionally it can also be randomly generated or a third party selected username. The password is transmitted to the third party over a secure channel.

The third party logs into the system using the username and password.

Optionally, initially the third party access is muted and must be unmuted by a registered pre-existing user in the system. This extra confirmation step is important to ensure that sensitive emergency related data (such as location data and/or site data) is not provided to any other third parties accidentally.

Optionally, the data access has an associated geofence. This way the view the third party has of the data can be further limited to only sections that are relevant to the third party.

When the emergency is over, any third party access is muted.

In order to ensure privacy and security, only minimal data is stored on any server(s) 106 or computing devices 102. By way of example, a number of different data models are used throughout the system by different devices. Where "local" is used in the data tables below means the data is stored locally on the computing device 102. Where "server" is used in the data tables below means the data is stored on the remote server(s) 106 and/or database 308. Where "stream" is used in the data tables below means the data is stored on Azure® servers ready for other computing devices 102 and/or remote server(s) 106 to receive it. Specifically the Azure events hub as shown on FIG. 9.

To manage any users or versions of the application 250 that require a license, such as the residential, commercial, and/or emergency services versions, the data model of Table 1 is used below. The data related to the application 250 and/or user's license is only accessed when querying login credentials (such as when logging in), querying information regarding the location that has declared an emergency and/or other instances when querying the user type is needed. No billing data is stored in any location and the license must be manually renewed. Alternatively, payment data can be stored on a payment service such as PayPal® and/or Stripe @. The user type is stored on the computing device 102 so that the correct version of the application can be stored. The absence of any license data triggers the free version of the application 250 to be used. Optionally, the emergency service workers have their own persistent contacts that will survive between emergencies. The contacts of some or all of the members of group chats or calls (as described below) can be persistently saved.

TABLE 1

License Information

| Data | Storage Location | Stored After Emergency |
| --- | --- | --- |
| Username | Server | Yes |
| Password | Server | Yes |
| UserType | Server/Local | Yes |
| Email | Server | Yes |
| ContactTelephoneNumber | Server | Yes |
| LicenseRenewalDate | Server | Yes |
| LicenseType | Server | Yes |

To manage the login of all users, the data model of Table 2 below is used. All users receive a user identifier (UserID). Optionally, the UserID is specific to the computing device 102. Alternatively the UserID is specific to the user such that if they log in using a different computing device 102 the UserID will be used on the different device. The user's location movement history is never stored by the system. Only the last known location is stored (in the LastKnownLocation variable). The LastKnownLocation variable is location data provided by the computing device 102 as described with reference to FIG. 2. When determining the direction a user is moving, or whether a user has moved. The previous LastKnownLocation is compared with a new LastKnownLocation overwrites the previous one. By comparing the two, direction is possible to detect without ever storing a history of the user's movement other than the last two time steps. After an emergency is declared as "safe" or no longer an emergency, all location data such as the 'lastKnownLocation' variable is removed. 'ContactDetails', 'Dependants' and 'SpecialNeeds' are stored on the computing devices 102 within a configuration file.

TABLE 2

User Information

| Data | Storage Location | Stored After Emergency |
|---|---|---|
| UserID | Local | Yes |
| UserType | Server/Local | Yes |
| LastKnownLocation | Stream | No |
| ContactDetails | Local | Requested |
| Dependants | Local | Yes |
| SpecialNeeds | Local | Yes |
| TimeSinceLastMove | Stream | No |

Whenever an emergency is reported, a unique session is created. This session is destroyed once the emergency is confirmed "safe". The data in the session model is only for tracking information relevant to that session and therefore has no purpose when the session is over.

TABLE 3

Session Information

| Data | Storage Location | Stored After Emergency |
|---|---|---|
| SessionID | Server | No |
| EmergencyType | Server | No |
| Location Data | Server | No |
| IsEmergencyActive | Server | No |
| Date | Local | No |

Site data can take a number of different forms including map model data, location model data, and building model data. Where relevant, some or all of this information may be used in an emergency depending on the area. For example, if the area where the emergency is occurring does not have any buildings, then no building data is used.

The map model comprises data for navigating at a "city level" or any other more zoomed out level that encompasses more than just the exact region the emergency is in and/or if the emergency spans across multiple buildings. The application will store 'ZoomLevel', 'ModeOfTravel' and 'MapRenderType' in a configuration file for convenience purposes when reopening the map view.

TABLE 4

Map Model Information

| Data | Storage Location | Stored After Emergency |
|---|---|---|
| MapID | Local | No |
| Zoom Level | Local | Yes |
| NearbyBuildings | Stream | No |
| QuickestRouteToDestination | Stream | No |
| DisanceToDestination | Stream | No |
| LongitudeData | Stream | No |
| LatitudeData | Stream | No |
| DestinationAddress | Local | No |
| ModeOfTravel | Local | Yes |
| MapRenderType | Local | Yes |

The location model comprises data (as described in Table 5 below) is used to display information regarding buildings in the map view but at a zoom level nearer than the "city level". 'LocationID' and 'GeofencingArea' are stored on the server-side and locally in case connectivity to the remote server 106 lost. Optionally, building plans are not be stored locally so as to save memory on the computing device 102. Any data stored locally will only be stored for user relevant to that building. For example residential and/or commercial users will only have the location model data stored for the building(s) they manage. No data is stored for other buildings. Data relating to the number of people ("NumOfES", "NumOfNonES", and "TotalNumOfPeople") are not transmitted to the free user versions of the application 250. Note that ES is short for emergency service workers.

TABLE 5

Location Model Information

| Data | Storage Location | Stored After Emergency |
|---|---|---|
| LocationID | Server/Local | Yes |
| NumOfES | Stream | No |
| NumOfNonES | Stream | No |
| GeofencingArea | Server/Local | Yes |
| TotalNumOfPeople | Stream | No |
| BuildingPlanData | Server | Yes |

The building model is used when a user is viewing the building in 2D or 3D. All building model data (as shown in Table 6 below) is stored on the remote server 106 and on the computing device 102 so that the information is readily available regardless of connectivity. Some data is not transmitted to the free user accounts such as the number of people on each floor ("NumberOfESonFloor" and "NumberOfNonESonFloor").

TABLE 6

Building Model Information

| Data | Storage Location | Stored After Emergency |
|---|---|---|
| BuildingID | Server/Local | Yes |
| NumOfFloors | Server/Local | Yes |
| 2DFullView | Server/Local | Yes |
| 3DFullView | Server/Local | Yes |
| BuildingName | Server/Local | Yes |
| BuildingAddress | Server/Local | Yes |

Similar to the Building model information, the floor model information as shown in Table 7 below, is stored on both the remote server 106 and the computing device 102 so that the information is readily available regardless of connectivity.

TABLE 7

Floor Model Information

| Data | Storage Location | Stored After Emergency |
|---|---|---|
| FloorID | Server/Local | Yes |
| FloorNumber | Server/Local | Yes |
| NumberOfESonFloor | Stream | No |
| NumberOfNonESonFloor | Stream | No |
| 2DFloorView | Server/Local | Yes |
| 3DFloorView | Server/Local | Yes |

As herein described a number of methods are described that the system and/or devices within the system are capable of performing. Many of the methods described below relate to tracking and/or management of location data. The location data described herein is preferably streamed from the computing devices 102.

Figure 12:
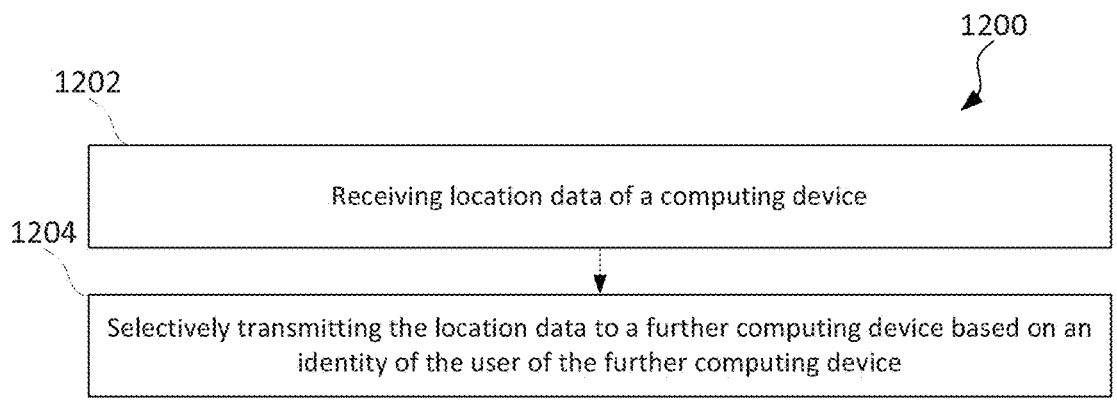
FIGS. 12 to 20 show example methods.

In one example, as described with reference to FIG. 12, a method 1200 of allowing tracking and managing an emergency situation comprises the steps of receiving 1202 location data of a computer device 102 and selectively transmitting 1204 the location data to a further computing device based on an identity of the user of the further computing device and on an emergency state. In this example, the computing device 102 here refers to a user in the emergency that needs to be tracked. This user may be any one of the free, residential, commercial, and/or emergency service users. During the emergency the user will need to have the application 250 installed on their computing device 120 to be able to transmit the location data. The selective transmission 1204 of location data is based on an identity of the user. If the user is an emergency services worker the location data will be transmitted to the computing device 102 of the emergency services worker.

As previously described, the system is configured to initiate and/or establish a unique session per emergency situation. An example method 1300 of initiating/establishing the session is provided as part of FIG. 13. This method is preferably used in conjunction with the method 1200 as described with reference to FIG. 12. Optionally, the steps 1302, 1304, 1306, 1308 of this method 1300 is run in parallel with the method 1200 of FIG. 12. Initially there is reception of information that there is an emergency. Preferably, this is in the form of an emergency report as herein described. Optionally, an emergency state is changed from unconfirmed to "active" (or confirmed). Optionally, an emergency starts in the "active" state.

Once the emergency has stopped in reality, there is reception 1306 of information indicative that the emergency has ended and now considered safe. Optionally, this is in the form of the emergency state change to "safe". Optionally, this is the emergency services providing a message to the system that the emergency has ended.

Preferably, while the emergency is running all data associated with the emergency, including all location data, is associated 1310 with the emergency session. This association is optionally tagging of any data with a session ID unique to the emergency session currently "active". Other ways to associate the data that can be used alternatively include: storing the location data in a session unique database, and/or storing the location data on a session unique server.

Once the emergency has stopped, the emergency session is ended and all non-persistent data associated with the emergency is deleted 1312. In particular, the location data is destroyed.

Further, optionally, the reception of any further data associated with the emergency is prevented. Preferably this is done by transmitting a message to all computing device 102 associated with the emergency where the message is configured to stop the application 250 sending location data (unless also associated with another emergency).

Figure 13:
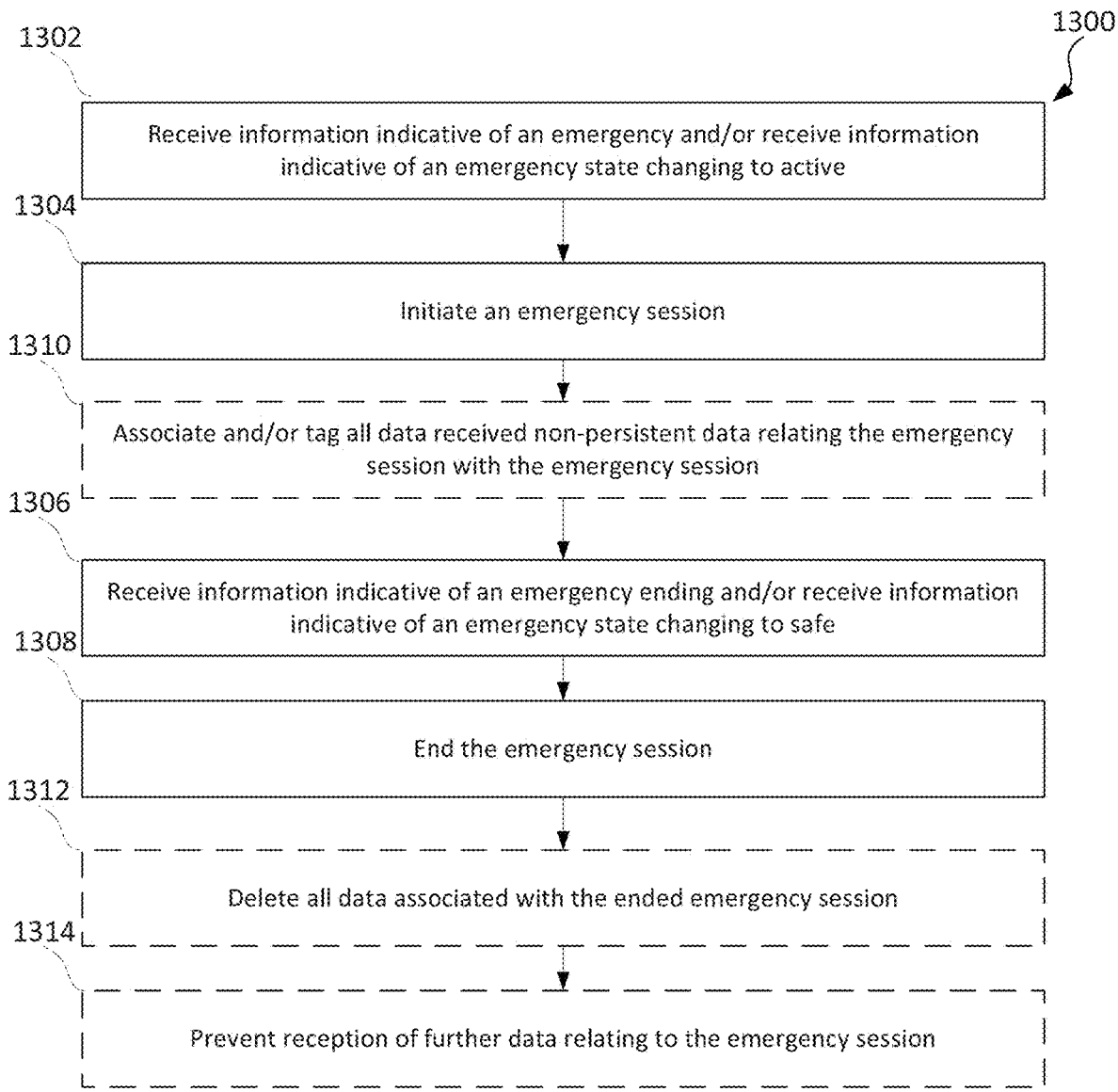
Figure 14:
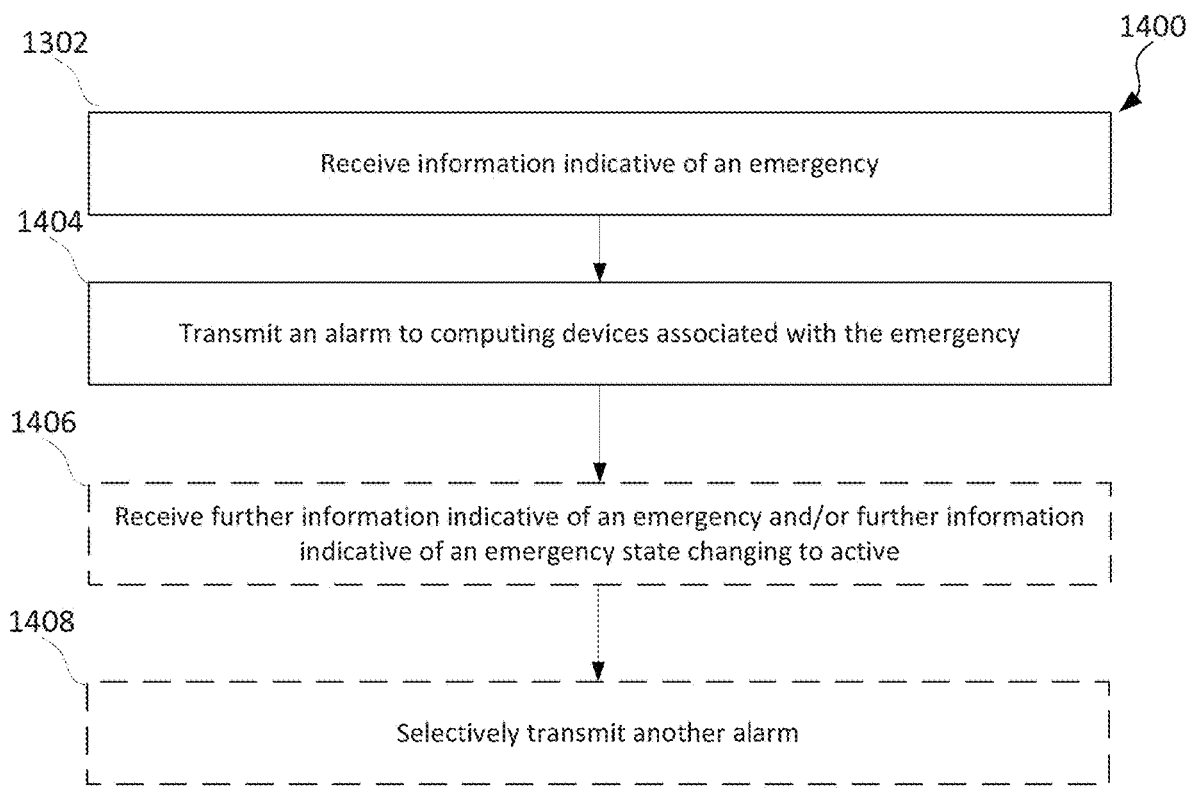

Referring to FIG. 14 an example method 1400 of transmitting an alarm to the computing devices 102 within the emergency is shown. This method 1400 may be used standalone and/or in combination with the other methods 1200, 1300 as shown in FIG. 12 and FIG. 13.

As with the method of FIG. 1300, this method 1400 is configured to start upon reception 1302 of information indicative of an emergency starting and/or the emergency state changing to being "active". In this example embodiment, the information indicative of an emergency starting is an emergency report (or alternatively described as a "user-activated alarm") as previously described. When this occurs, an alarm is transmitted 1404 to computing devices 102 (that have the application 250 installed) associated with the emergency.

Optionally, if additional information indicative of an emergency starting is received 1406 then, in this case an alarm is selectively transmitted 1408.

Determination of whether to transmit further alarms is based on comparing the further information indicative of an emergency with the original information indicative of an emergency. If the further information indicative and the original information indicative of an emergency starting are substantially the same then an alarm is not sent. In this example, a number of characteristics of the emergency are compared to test whether further alarms shall be sent. In particular, the characteristic may be any one or more of the following: the location of the emergencies, the type of emergency (fire versus flood), date and/or time of the emergency, and/or the user sending the information indicative of an emergency.

This method can alternatively be described in the following steps: receiving a user-activated alarm from at least one computing device 102 and when a further user-activated alarm is received that relates to the same emergency as the first user-activated alarm, the further user-activated alarm is disregarded.

Figure 15:
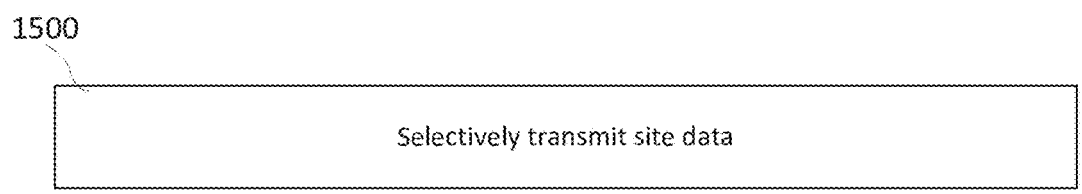

Referring to FIG. 15, according to another example, step 1500 of selectively transmitting site data to computing devices 102 within the emergency is shown. This step 1500 may be used in combination with any of the other methods as herein described. This step 1500 selectively transmits site data to computing devices 102 within the emergency. The selectivity is based on an identity of the user as is described with reference to the method 1200 of FIG. 12. The same selection process is used for this step 1500.

Figure 16:
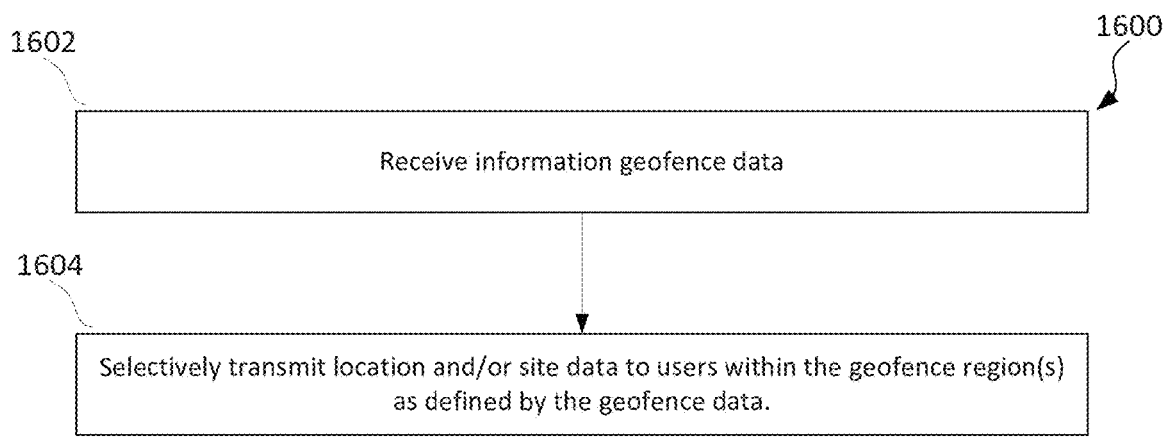

As previously described, geofencing is possible. Referring to FIG. 16, another example method 1600 relating to geofencing data is shown. This method 1600 may be used in combination with any other method herein described or independently. In the first step where the geofence data is received 1602. This geofence data may be received before the emergency starts or during the emergency. This geofencing data modifies where and to whom the data is transmitted within the emergency. The geofencing data comprises at least one region.

If the user is within the geofenced region, then they the location and/or site data will be transmitted 1604 to the computing device of the user. Optionally or additionally a user is associated with a geofence region such that even if they are not in the region, they will still be transmitting data relating to the geofence region.

Figure 17:
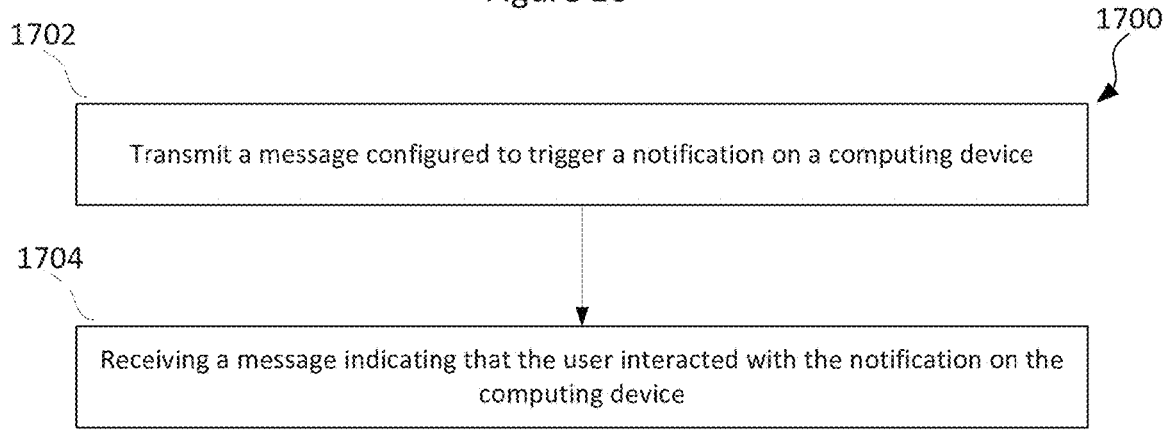

Referring to FIG. 17, an example method 1700 relating to checking if a user is near and/or using their phone is shown. The first step is transmitting a message to all those users we want to know the status of. In particular, usually it is the status of the free users which are to be checked so therefore the message is only transmitted to those free users. The message is configured to trigger a notification on the computing device 102 of all that receive it.

Upon reception of the notification, a user will interact with the notification. This will trigger the computing device 102 to transmit a message back saying that a user has interacted with the notification. This information is useful to know that the user is alive, the user is capable of using their computing device 102 and that the computing device 102 is functioning and/or connected to the Internet 104.

Figure 20:
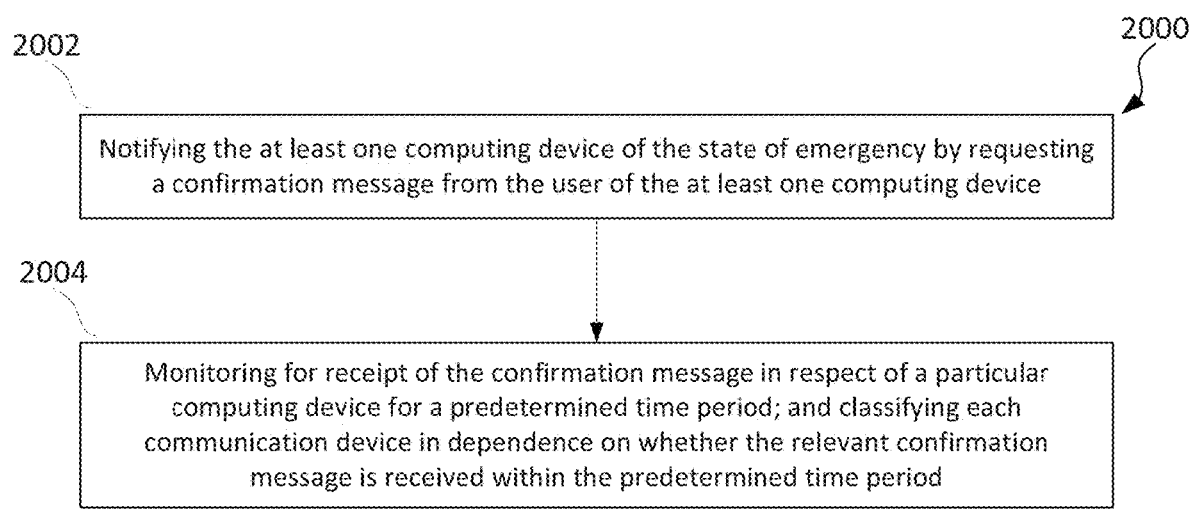

Method 1700 can be alternatively described as the method 2000 shown in FIG. 20. The first step is notifying 2002 the at least one computing device of the state of emergency, wherein the notification comprises a confirmation message. And then monitoring 2004 for receipt of the confirmation message in respect of a particular computing device for a predetermined time period; and classifying each computing device 102 in dependence on whether the relevant confirmation message is received within the predetermined time period.

Figure 18:
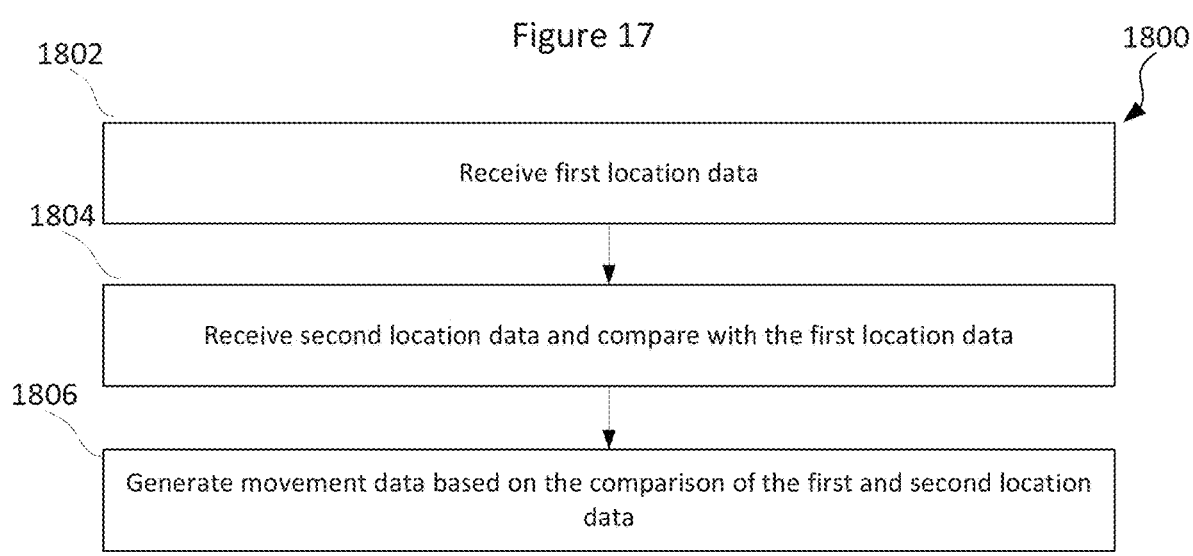

Referring to FIG. 18, an example method 1800 of generating movement data of a user is shown. The first steps 1802, 1804 comprise receiving a first and second location data. The second location data arrives at a later time than the first location data. By comparing the two data points movement data can be generated. Preferably the comparison is subtraction of one from the other.

The movement data generated can be either or both of whether the computing device 102 has moved and/or the direction the computing device has moved.

As a further example configuration of the system, all emergency workers can optionally a group chat and/or call based on the emergency they are responding to and/or the region (as defined by a geofence) they are associated with. Push to talk services may also be used to transmit voice messages to others and save the hassle of typing messages out.

Figure 19:
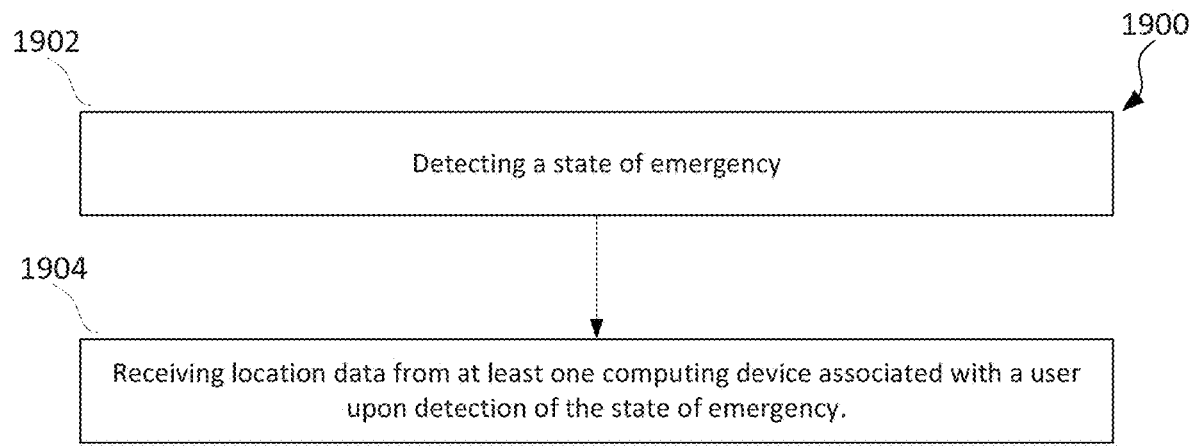

Referring to FIG. 19, an example method 1900 of tracking and managing an emergency situation comprises the steps of detecting 1902 a state of emergency and then receiving 1904 location data from at least one computing device 102 associated with a user upon detection of the state of emergency. This method 1900 may be used in addition or as an alternative to the method 1200 as described with reference to FIG. 12.

The example methods 1200, 1300, 1400, 1500, 1600, 1700, 1800, 1900, 2000 as herein described are run within the overall emergency tracking system. The methods 1200, 1300, 1400, 1500, 1600, 1700, 1800, 1900, 2000 may be run in parallel and/or asynchronously. Optionally, some or all of the methods 1200, 1300, 1400, 1500, 1600, 1700, 1800, 1900, 2000 are run. In particular however, these methods may be configured to run on a remote server 106 and/or across plurality of remote servers 106. The methods 1200, 1300, 1400, 1500, 1600, 1700, 1800, 1900, 2000 can be implemented as computer code and as such can be configured to run on any generic CPU.

Care has been taken with regards to the security of this system. The overall system aims to minimise the amount of sensitive data stored on the database. Appropriately removing the data in a timely fashion is important. This is managed by deleting data when not required and/or preventing the further streaming of data when not required. Further, data that is not required for the system to operate is not transmitted, requested or received. In cases where data reception and storage is unavoidable, steps are taken to secure the data as much as possible, including encryption such that only specified users can interact with the data.

Displaying information as accurately as possible is a further challenge while similarly trying to make sure not too much data is required. Accuracy of user location within a building, and the representation of a 3D building and its rooms from a 2D plan are both important and both accurate site data which depends on the accuracy of the site data provided and accurate location. All this needs to happen whilst updating positions at regular short term intervals. Overcoming the abovementioned challenges is achieved by combining a number of methods. Making use of the various sensors integrated with computing devices 102 (in particular with smartphones, an example of which is described with reference to FIG. 2), such as GPS and signal strength can be used to measure altitude (as an example). Further, with blueprints of buildings provided by users further augmented by the editor provided, accurate site data is possible (as described with reference to FIG. 9).

Through the use of geofencing (as described above), the amount of streamed data is limited. Further, geofencing allows a greater ability to provide more fine grained control to access to data within the system. Once the system has established which users are within and/or associated with a geofence region, said users will only receive data that is relevant to said region. Further, only users within and/or associated with the geofenced region will be queried for information and/or provide information. The query for and/or provision of data is conducted at regular intervals.

Additionally, since there are only a small number of users on-site that require all the location data of each user, the amount of read-data is significantly reduced thereby reducing the load on the overall system.

Reducing the load on the overall system is important in the context of an emergency situation as reliability is important. By reducing total load, the system is thereby reducing the chances of overloading. Overload can cause slowdowns of the system or worse a crash of the system.

The described embodiments and examples of the invention are only examples of how the invention may be implemented. Modifications, variations and changes to the described embodiments and examples will occur to those having appropriate skills and knowledge. These modifications, variations and changes may be made without departure from the scope of the claims.

The invention claimed is:

1. A method of locating one or more users in an emergency, comprising the steps of, at a server:
   detecting a state of emergency; and
   receiving a user-defined geo-fenced area from at least one computing device associated with a user, wherein the user-defined geo-fenced area is defined by a user of the at least one computing device associated with the user;
   determining whether the state of emergency relates to the user-defined geo-fenced area; and
   upon determining that the state of emergency relates to the user-defined geo-fenced area;
   receiving location data relating to the user-defined geo-fenced area from a member of a group consisting of:
      the at least one computing device associated with the user, and
      another at least one computing device associated with another user;
   selectively transmitting, to at least one member of the group:
      the location data; and
      mapping data relating to the user-defined geo-fenced area, wherein the mapping data further relates to the interior of at least one building, and
   causing the location data, in combination with the mapping data, to be presented on a display interface of the at least one member of the group.

2. A method according to claim 1, wherein the location data is continually streamed.

3. A method according to claim 1, further comprising the step of establishing a session for data transfer during the course of the emergency upon detection of the state of emergency, preferably wherein location data is received only while the session is in place.

4. A method according to claim 3, further comprising the steps of detecting the end of the state of emergency; and ending the session upon detection of the end of the state of emergency; preferably wherein ending the session comprises deleting data associated with the session.

5. A method according to claim 1, wherein the state of emergency is in relation to a particular area and data transmitted in relation to the at least one computing device is geo-fenced based on the bounds of the particular area, wherein the particular area is the user-defined geo-fenced area.

6. A method according to claim 5, further comprising the step of recording when a computing device leaves the particular area, wherein the particular area is the user-defined geo-fenced area.

7. A method according to claim 1, wherein detecting a state of emergency comprises receiving a user-activated alarm from at least one computing device.

8. A method according to claim 7, further comprising the step of receiving a further user-activated alarm; determining whether the further user-activated alarm relates to the same emergency as the user-activated alarm; and, upon determining that the further user-activated alarm relates to the same emergency as the user-activated alarm, disregarding the further user-activated alarm.

9. A method according to claim 1, further comprising the step of notifying the at least one computing device of the state of emergency.

10. A method according to claim 9, wherein said notifying comprises requesting a confirmation message from the user of the at least one computing device.

11. A method according to claim 10, further comprising the step of monitoring for receipt of the confirmation message in respect of a particular computing device for a predetermined time period; and classifying each computing device in dependence on whether the relevant confirmation message is received within the predetermined time period.

12. A method according to claim 1, further comprising the step of receiving, in addition to the location data, at least one of the following information from the at least one computing device: contact information; the number of people at the location of the computing device and/or under the care of the user of the computing device; any special assistance requirements of the people at the location of the computing device and/or under the care of the user of the computing device.

13. A method according to claim 1, further comprising the step of comparing location data with previously received location data from a particular computing device to determine movement of the computing device.

14. A method according to claim 1, wherein the step of selectively transmitting the location data to the member of the group is based on an identity of the user(s) associated with the at least one computing device.

15. A method according to claim 14, wherein the step of selectively transmitting mapping data related to the user-defined geo-fenced area in which the emergency is occurring to the member of the group is based on an identity of the user(s) of the at least one computing device; preferably wherein the mapping data comprises data indicative of at least a 2D, 3D and/or augmented reality view of a or the area associated with the emergency situation.

16. A method according to claim 14, wherein said selective transmission is based on whether the user of the further computer device(s) is a member of the emergency services.

17. A computer program product comprising instructions which, when executed by a computer program, cause the computer processor to carry out the method of claim 1.

18. A system for locating one or more users in an emergency; comprising: a server; and one or more computing devices; the server and/or at least one computing device being configured to carry out the method of claim 1.

19. A method according to claim 14, wherein said selective transmission is based on an association of the user(s) of the additional computing device with the user-defined geo-fenced area.

20. A method according to any of the preceding claims, wherein building mapping data comprises a floorplan and/or a blueprint of at least one building.

* * * * *